US009802827B2

(12) United States Patent
Showalter

(10) Patent No.: US 9,802,827 B2
(45) Date of Patent: Oct. 31, 2017

(54) PURIFIED SILICON, DEVICES AND SYSTEMS FOR PRODUCING SAME

(71) Applicant: Milwaukee Silicon, LLC, Milwaukee, WI (US)

(72) Inventor: M. Robert Showalter, Milwaukee, WI (US)

(73) Assignee: Milwaukee Silicon, LLC, Milwaukee, WI (US)

( * ) Notice: Subject to any disclaimer, the term of this patent is extended or adjusted under 35 U.S.C. 154(b) by 0 days.

(21) Appl. No.: 15/287,062

(22) Filed: Oct. 6, 2016

(65) Prior Publication Data

US 2017/0197841 A1 Jul. 13, 2017

Related U.S. Application Data

(60) Provisional application No. 62/239,514, filed on Oct. 9, 2015.

(51) Int. Cl.
| | | |
|---|---|---|
| *C01B 33/037* | (2006.01) | |
| *B01J 10/00* | (2006.01) | |
| *B01J 8/02* | (2006.01) | |
| *B01J 8/20* | (2006.01) | |
| *B01D 21/00* | (2006.01) | |

(52) U.S. Cl.
CPC ........ *C01B 33/037* (2013.01); *B01D 21/0084* (2013.01); *B01J 8/0278* (2013.01); *B01J 8/20* (2013.01); *B01J 10/005* (2013.01); *C01P 2006/80* (2013.01)

(58) Field of Classification Search
CPC ..... B01J 10/005; B01J 8/0278; C01B 33/037; B01D 21/0084

See application file for complete search history.

(56) References Cited

U.S. PATENT DOCUMENTS

| | | | |
|---|---|---|---|
| 5,182,091 A | 1/1993 | Yuge et al. | |
| 5,563,068 A | 10/1996 | Zhang et al. | |
| 5,776,416 A | 7/1998 | Oda | |
| 5,783,162 A | 7/1998 | Tomita et al. | |
| 5,972,107 A | 10/1999 | Schmid et al. | |
| 7,625,541 B2 * | 12/2009 | Fukuyama | C01B 33/037 423/348 |
| 2001/0047102 A1 | 11/2001 | Schattenmann | |
| 2002/0161254 A1 | 10/2002 | Schattenmann | |
| 2003/0047207 A1 | 3/2003 | Aylaian | |
| 2003/0100144 A1 | 5/2003 | Schneider | |
| 2003/0124871 A1 | 7/2003 | Arghavani et al. | |

(Continued)

FOREIGN PATENT DOCUMENTS

| | | |
|---|---|---|
| CA | 2211028 A1 | 4/1998 |
| DE | 102011004753 A2 | 8/2012 |

(Continued)

OTHER PUBLICATIONS

Fluidized Bed Reactor Graphic.svg—Wikimedia Commons; https://commons.wikimedia.org/wiki/File:Fluidized_Bed_Reactor_..; printed Dec. 14, 2016.

(Continued)

*Primary Examiner* — Lessanework Seifu
(74) *Attorney, Agent, or Firm* — Husch Blackwell LLP

(57) ABSTRACT

The present disclosure provides devices and systems that utilize concurrent and countercurrent exchange platforms to produce purified silicon.

20 Claims, 20 Drawing Sheets

(56) References Cited

U.S. PATENT DOCUMENTS

| | | |
|---|---|---|
| 2003/0211680 A1 | 11/2003 | Arghavani et al. |
| 2004/0000699 A1 | 1/2004 | Brogle |
| 2004/0084077 A1 | 5/2004 | Aylaian |
| 2005/0106091 A1 | 5/2005 | Shapiva et al. |
| 2005/0139148 A1 | 6/2005 | Fujiwara et al. |
| 2006/0089258 A1 | 4/2006 | Hinman et al. |
| 2007/0190752 A1 | 8/2007 | Faris |
| 2008/0031799 A1 | 2/2008 | Fukuyama et al. |
| 2008/0202582 A1 | 8/2008 | Noda |
| 2009/0091339 A1 | 4/2009 | Chen et al. |
| 2009/0155140 A1 | 6/2009 | Ishii et al. |
| 2010/0140558 A1 | 6/2010 | Carlson et al. |
| 2010/0196435 A1 | 8/2010 | Freeman et al. |
| 2010/0202954 A1 | 8/2010 | Yamada et al. |
| 2010/0254879 A1 | 10/2010 | Nichol |
| 2010/0284887 A1 | 11/2010 | Mai |
| 2010/0295061 A1 | 11/2010 | Sachs et al. |
| 2011/0008236 A1 | 1/2011 | Hinman et al. |
| 2011/0041903 A1 | 2/2011 | Zehavi et al. |
| 2011/0057358 A1 | 3/2011 | Mostajeran et al. |
| 2011/0073184 A1 | 3/2011 | Noda |
| 2011/0200514 A1 | 8/2011 | Hoshino et al. |
| 2011/0214999 A1 | 9/2011 | Nottke et al. |
| 2011/0243825 A1 | 10/2011 | Schumacher |
| 2011/0243827 A1 | 10/2011 | Schumacher |
| 2011/0297223 A1 | 12/2011 | Krause et al. |
| 2011/0300222 A1 | 12/2011 | Sailor et al. |
| 2012/0020865 A1 | 1/2012 | Hoshino et al. |
| 2012/0100058 A1 | 4/2012 | Arita et al. |
| 2012/0279439 A1 | 11/2012 | Hoshino et al. |
| 2012/0304699 A1 | 12/2012 | Hintermayer |
| 2012/0312370 A1 | 12/2012 | Demopoulos et al. |
| 2013/0089490 A1 | 4/2013 | Filtvedt et al. |
| 2013/0102102 A1 | 4/2013 | Sun |
| 2013/0156675 A1 | 6/2013 | Breneman |
| 2013/0174607 A1 | 7/2013 | Wootton et al. |
| 2013/0195746 A1 | 8/2013 | Chu |
| 2013/0219889 A1 | 8/2013 | Shao |
| 2013/0236518 A1 | 9/2013 | Freeman et al. |
| 2013/0270658 A1 | 10/2013 | Behrendt |
| 2014/0050648 A1 | 2/2014 | Becker et al. |
| 2014/0124963 A1 | 5/2014 | Sachs et al. |
| 2014/0154184 A1 | 6/2014 | Sailor et al. |
| 2014/0369918 A1 | 12/2014 | Breneman |
| 2015/0087050 A1 | 3/2015 | Cunin et al. |
| 2015/0110701 A1 | 4/2015 | Laine et al. |
| 2015/0144174 A1 | 5/2015 | Fefelov et al. |

FOREIGN PATENT DOCUMENTS

| | | |
|---|---|---|
| JP | H02145413 A | 6/1990 |
| JP | H09309716 A | 12/1997 |
| JP | H10120412 A | 5/1998 |
| JP | H10167716 A | 6/1998 |
| JP | H11049510 A | 2/1999 |
| JP | 2001-201017 A | 7/2002 |
| JP | 2003-002629 A | 1/2003 |
| JP | 2003-238138 A | 8/2003 |
| WO | 2012/086544 A1 | 6/2012 |

OTHER PUBLICATIONS

M. Robert Showalter, Interchangeable semiconductor silicon production from metallurgical silicon, http://www.mrshowalter.net/InterchangeableSilicon.htm; printed Jul. 29, 2015.

Beyond six nines: Ultra-enriched silicon paves the rad to quantum computing, Aug. 12, 2014 by Joshua Pomeroy, http://phys.org/news/2014-08-nines-ultra-enriched-silicon-paves-rad.html, printed Jun. 30, 2015.

K. Matsuda, et al., Physical Review B 88, 115125-1 to 115125-7, 2013.

K. Tamura et al., Review of Scientific Instruments, vol. 70, No. 1, pp. 144-152, Jan. 1999.

C. Tao, et al., Solar Energy Materials & Solar Cells, 95 (2011) 3176-3180.

M. Lima et al., Energy Technology 2014: Carbon Dioxide Management and Other Technologies, TMS (The Minerals, Metals & Materials Society), 2014, pp. 279-286.

J. Safarian et al., Metallurgical and Materials Transactions B, vol. 43B, Dec. 2012, pp. 1427-1445.

C.P. Khattak et al., Production of Solar Grade (SoG) Silicon by Refining Liquid Metallurgical Grade (MG) Silicon, Annual Report Jun. 10, 1998-Oct. 19, 1999, report date Dec. 1999.

C.P. Khattak et al., Production of Solar Grade (SoG) Silicon by Refining Liquid Metallurgical Grade (MG) Silicon, Final Report Apr. 19, 2001, report date Aug. 2001.

S.M. Schnurre et al., Journal of Crystal Growth 250 (2003) 370-381.

S.M. Schnurre et al., Journal of Non-Crystalline Solids 336 (2004) 1-25.

Dr. Oleg S. Fishman, Solar Silicon Part I, Advanced Materials & Processes, Sep. 2008, 39-40.

Dr. Oleg S. Fishman, Solar Silicon Part II, Advanced Materials & Processes, Oct. 2008, 33-34.

Ceccaroli et al., Handbook of Photovoltaic Science and Engineering, Chapter 5, pp. 153-204, 2003.

\* cited by examiner

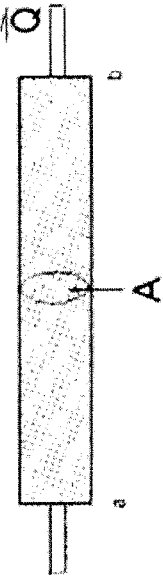
Fig. 1a
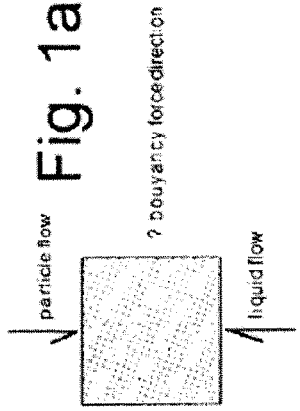
Fig. 1b
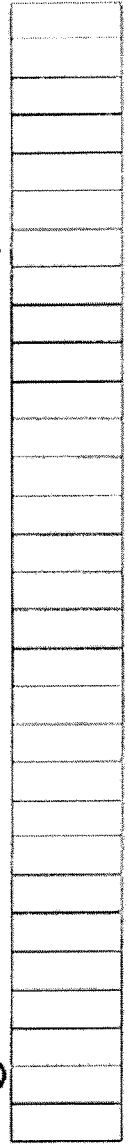
Fig. 1C   Real case: flow equilibrating continuously through bed of particles
Fig. 1D   Model: tank-in-series flow between "theoretical plates"
Fig. 1e   Model: flow equilibrating with "theoretical plates" along a CURVED path
Note: for LIQUID to PARTICLE SURFACE equilibration, the length of a "theoretical plate" is roughly 3-5 particle diameters.

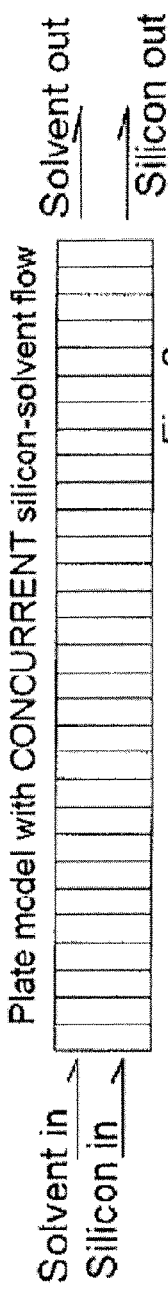
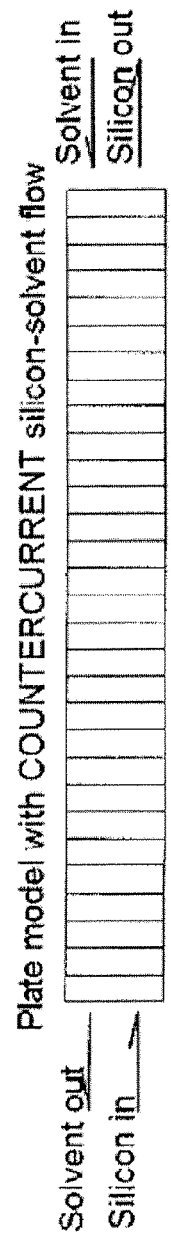
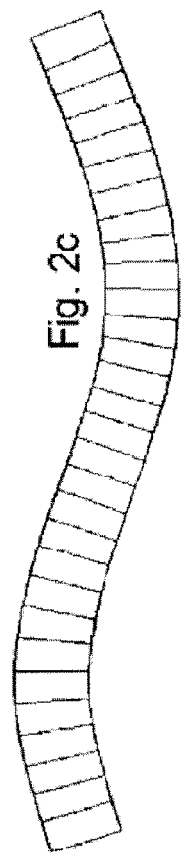
Fig. 2a — Plate model with CONCURRENT silicon-solvent flow
Fig. 2b — Plate model with COUNTERCURRENT silicon-solvent flow
Fig. 2c — The notions of COUNTERCURRENT EXCHANGE and CONCURRENT EXCHANGE also make sense for curved streamlines.

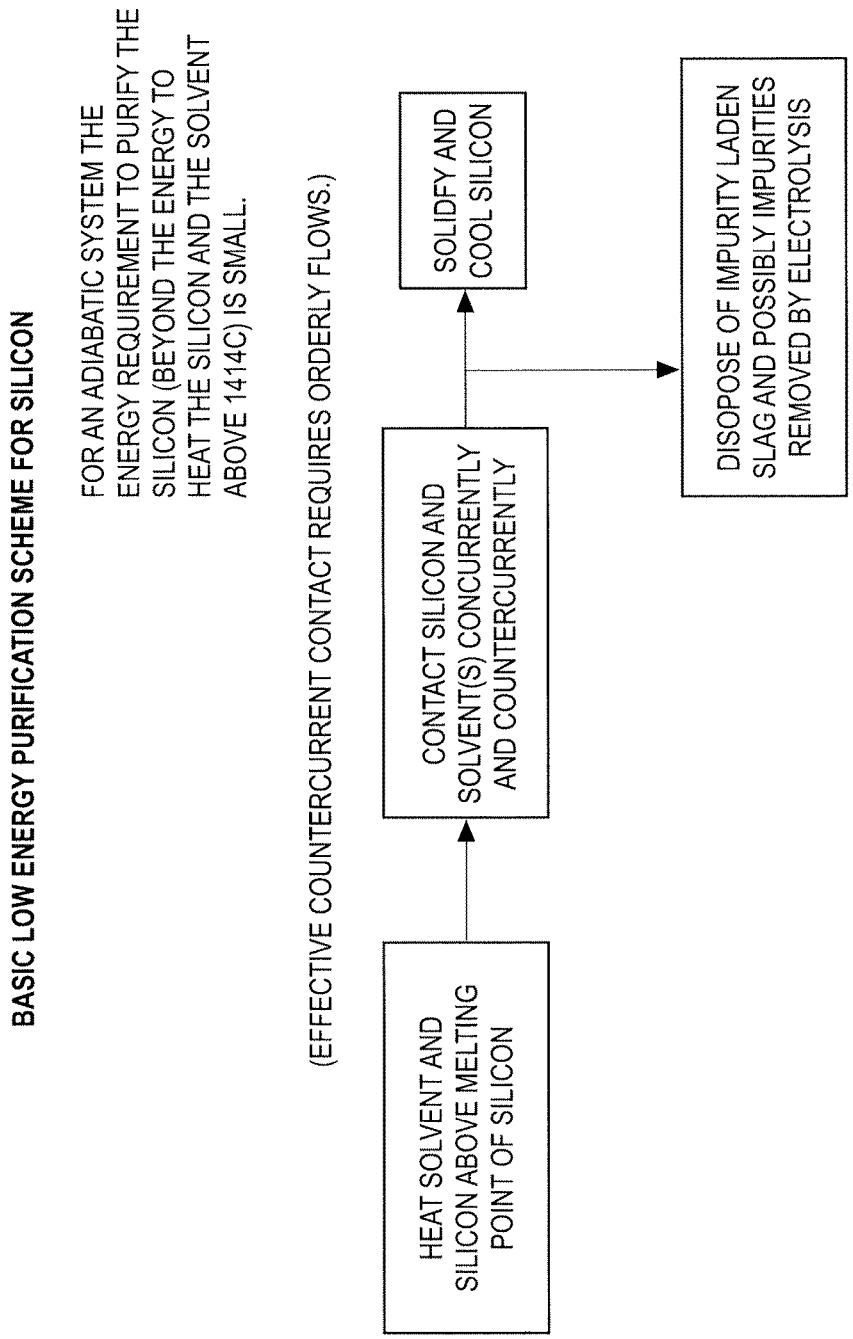

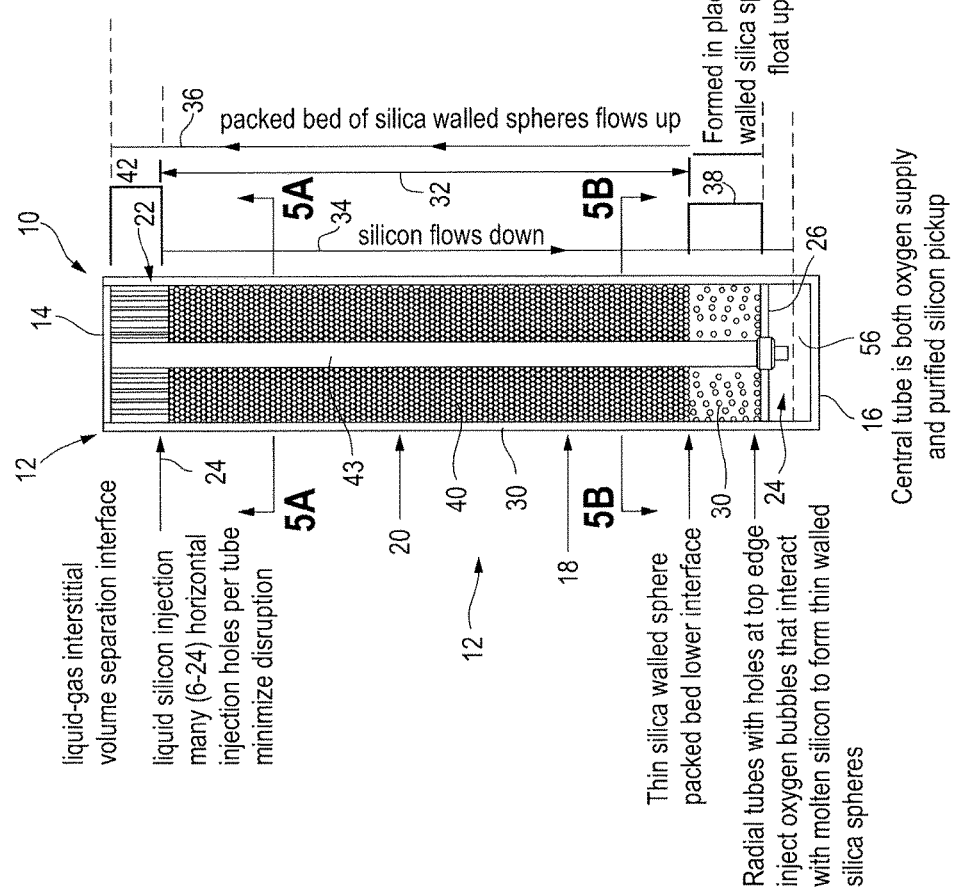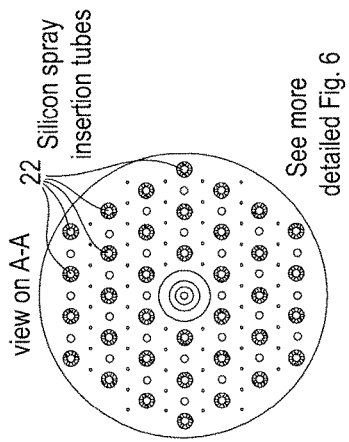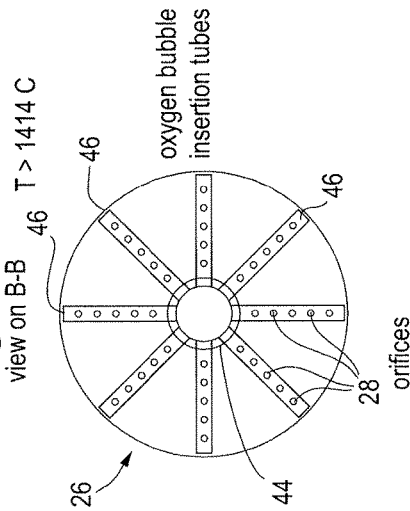

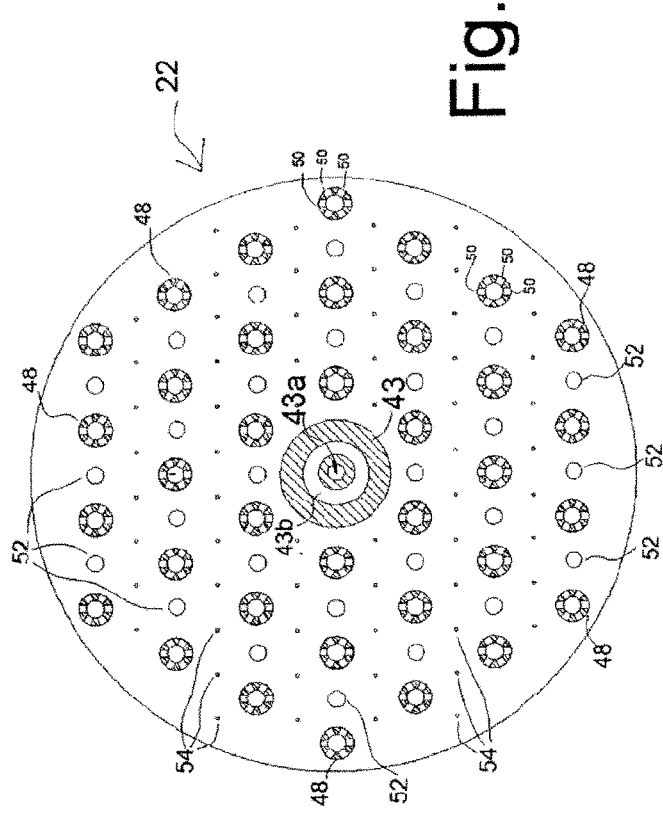

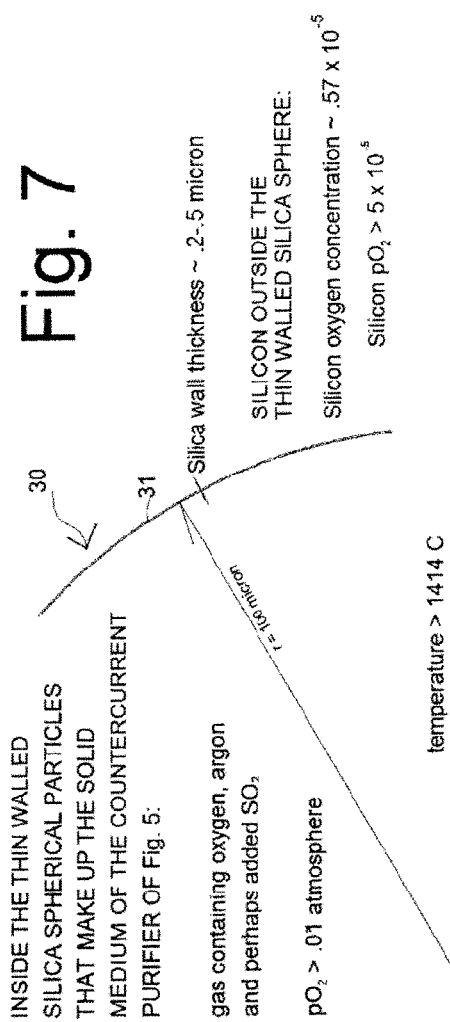

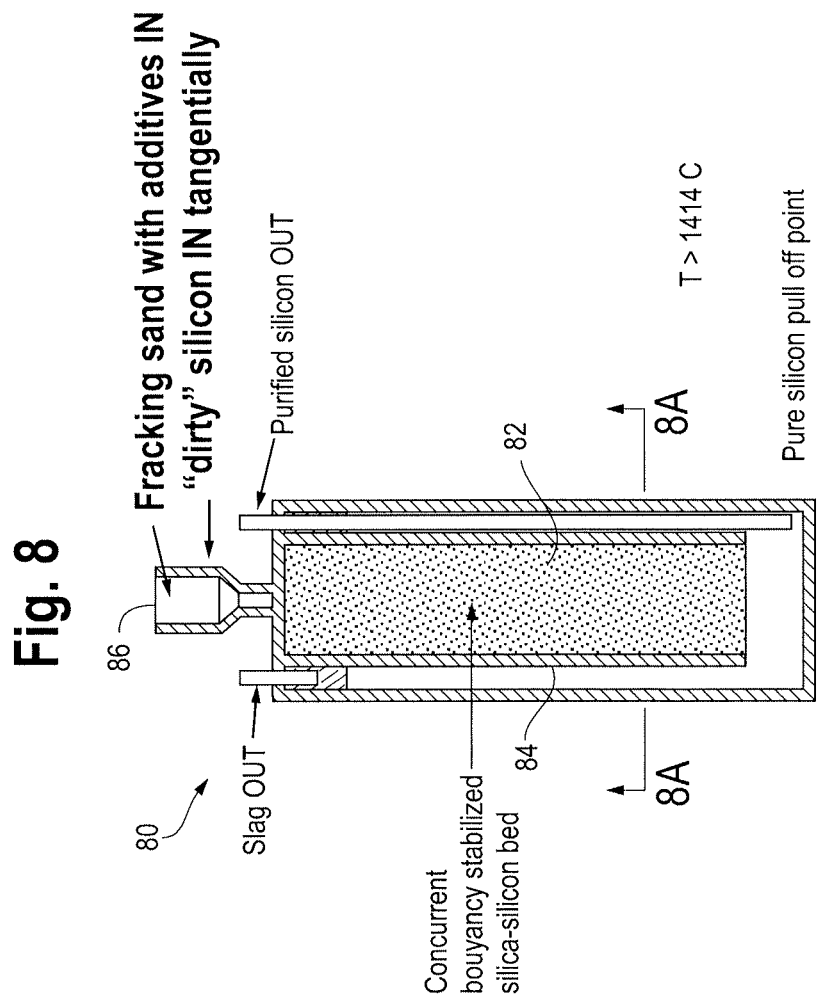

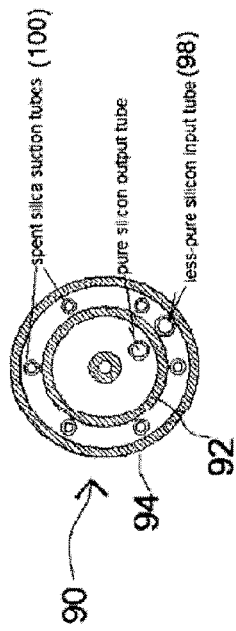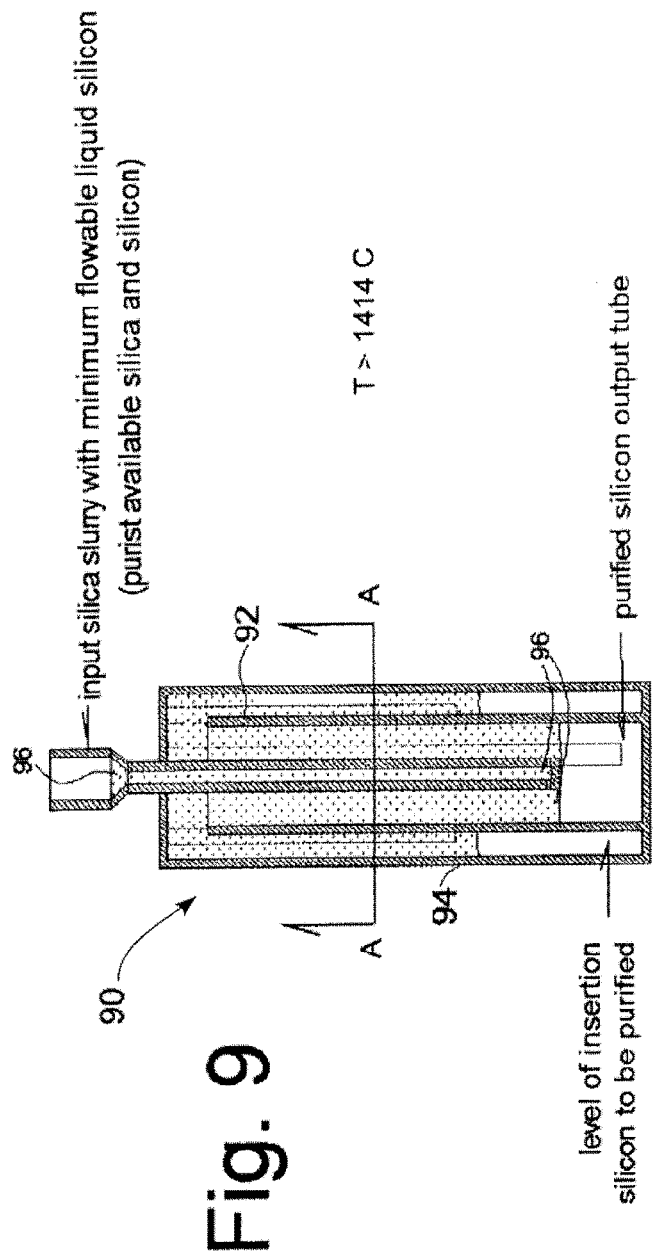

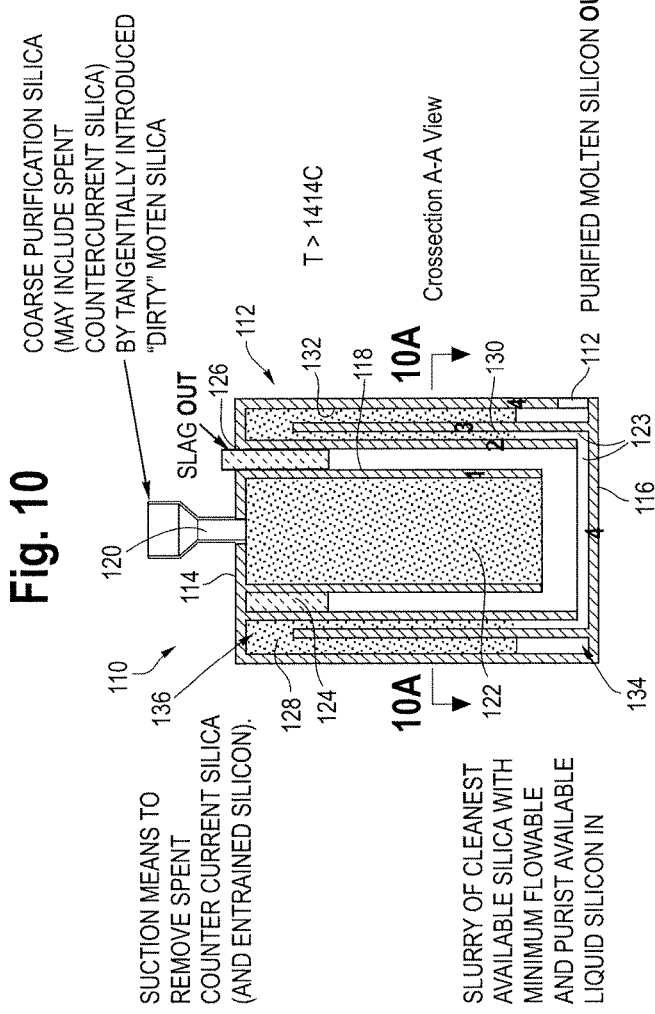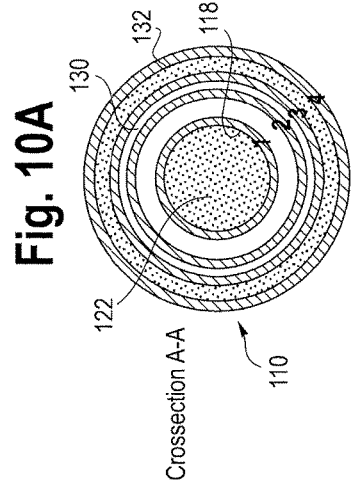

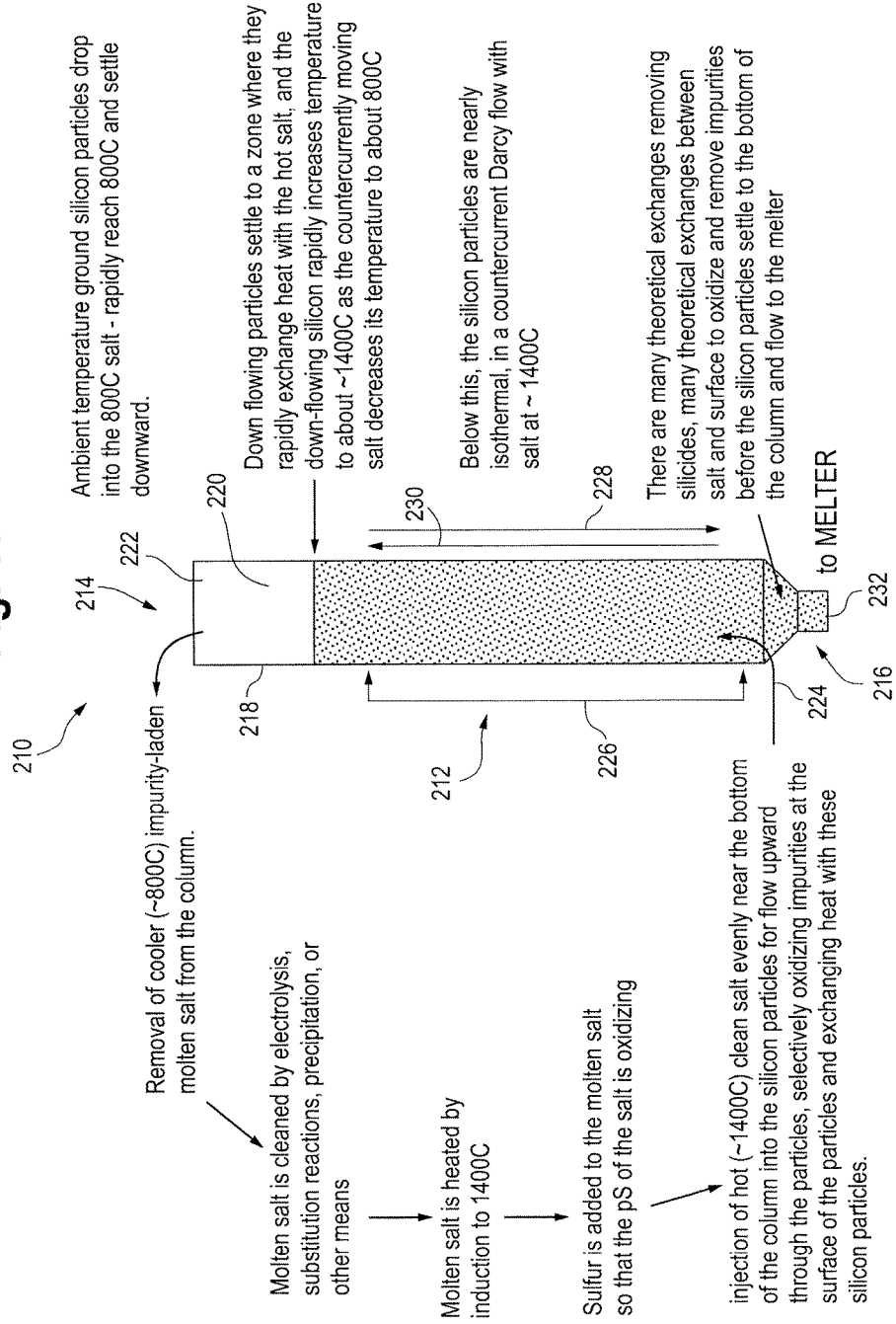

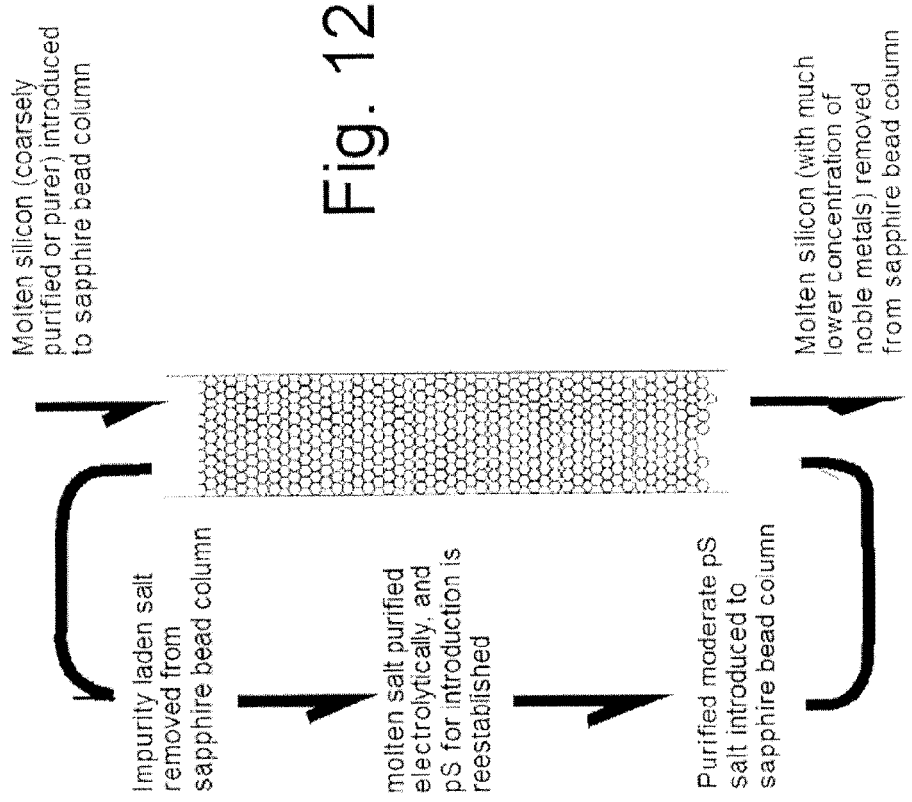

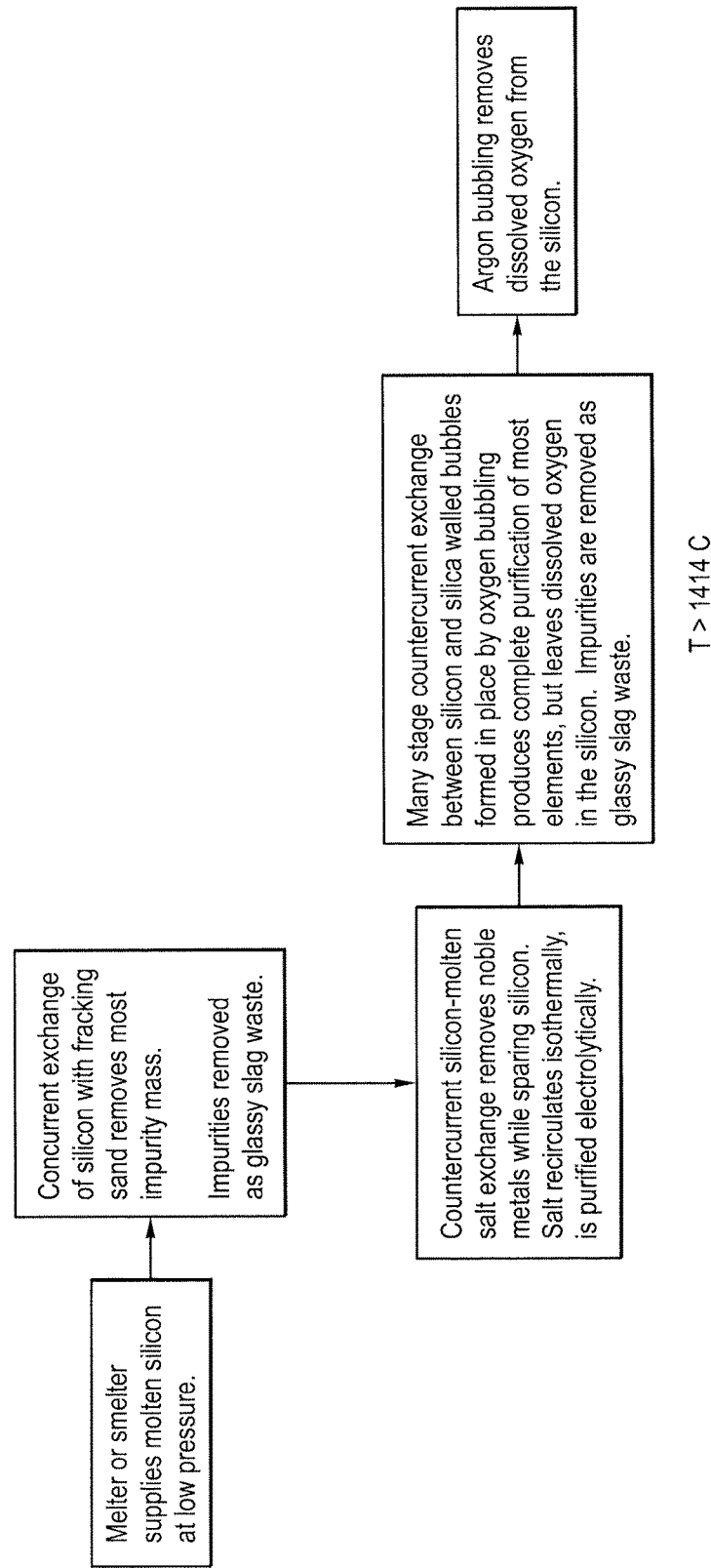

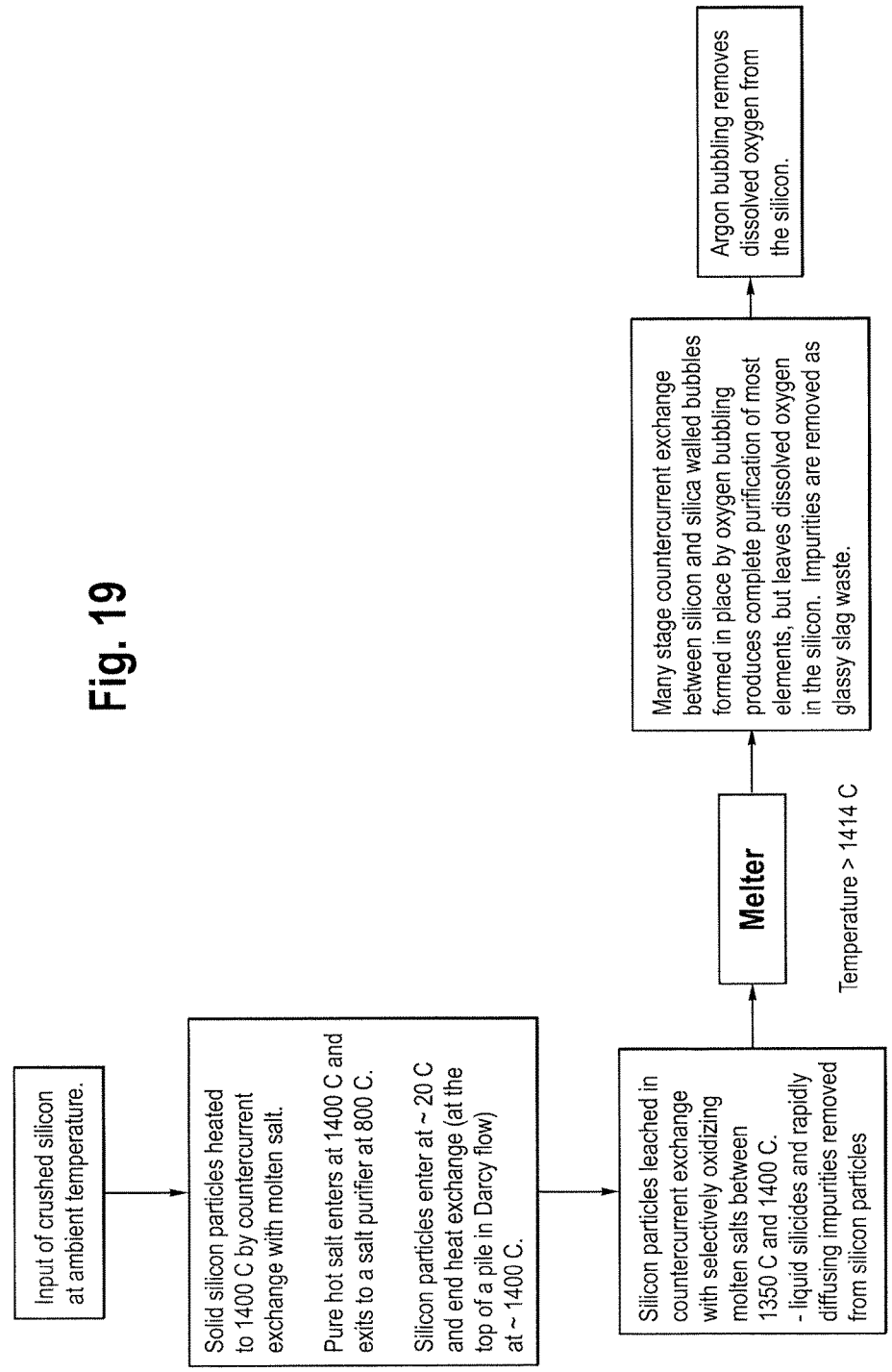

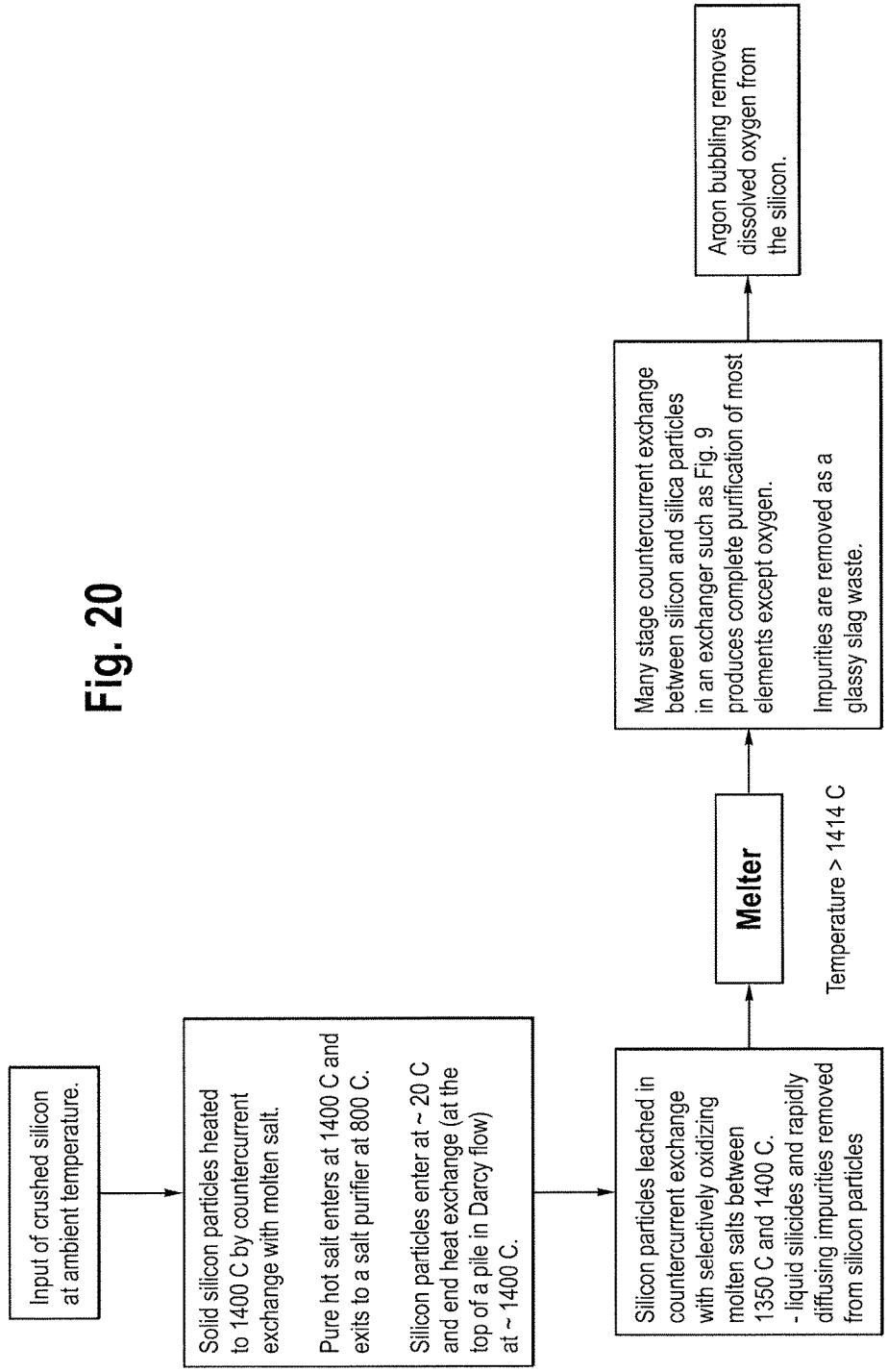

PURIFIED SILICON, DEVICES AND SYSTEMS FOR PRODUCING SAME

BACKGROUND

The present disclosure is directed to devices and systems for producing purified silicon, and the resultant purified silicon.

Extreme purity in semiconductor silicon is necessary, and best available silicon purity is prized in semiconductor production. Improved silicon purity translates into improved semiconductor production statistics and improved semiconductor operation. Silicon based photocell efficiency and photocell production could also be more efficient if much purer silicon was available cost effectively for silicon based photocell production. In general, given ideal processing, the ideal silicon for any photocell or semiconductor purpose (setting cost aside) would be purity so high that no elements other than silicon were detectable in the silicon, purity so high that the exact value of the concentrations of impurities were immaterial for any practical purpose, and in the ideal limit, perfect or asymptotic purity, where the presence of single atoms of impurity elements in the silicon was improbable. Such "perfect for all practical purposes" purity would provide maximum control of crystallization, P—N doping, resistivity, and charge carrier lifetime. Every impurity element in the Periodic Table slows, degrades and disorders silicon crystallization to some degree. Elements in electron acceptor group 13 (B, Al, Ga, etc) and electron donor group 15 (N, P, As, Sb etc) determine whether the dominant charge carrier in the silicon is electrons or holes, and are very important for resistivity. The transition metals all reduce charge carrier lifetimes, with the deleterious effect on charge carrier lifetime increasing moving to the left and down on the periodic table. Ta, Mo, Mb, Zr, W, Ti, and V atoms significantly reduce crystalline silicon charge carrier lifetimes at sub part per billion concentrations. For the best possible photocells, or the best semiconductors (especially for high frequency operation, or where energy costs are important, as in cell phones and tablets) one wants the longest available charge carrier life and the highest available silicon resistivity.

The energy costs of silicon production are also important. Energy costs are especially important for silicon photocell production if silicon photocells are to have a practical chance of replacing fossil fuel energy production on a world scale. Current photocell energy production (which is mostly from silicon based photocells) is less than 1% of world energy consumption. At that relatively small scale, the energy cost of refining the silicon may not be crucial. However, if energy production from silicon photocells is ever to approach world energy consumption, so as to significantly displace fossil fuel production, it would be desirable to greatly reduce the energy cost of refined silicon production—and desirable to do so with much higher purities than are available in "solar grade silicon" now.

It is estimated that the energy cost to manufacture 1 kg of silicon wafers for photocells now is about 1000 kilowatt hours. Energy payback for current production silicon photocells is therefore more than two years. Very rapid growth of multi-terawatt scale silicon photocell deployments needed to significantly replace world fossil fuels use with this silicon energy cost would require inconvenient and probably commercially impossible energy inputs. The scale of silicon production needed to produce multi-terawatt outputs of silicon based photocells is large. Assuming that 500 watts of photocells can be made per kilogram of purified silicon, production of $10^{12}$ watts of photocells in ten years of continuous production would take production of about 550 tons of purified silicon per day during that decade of production. To replace world consumption of fossil fuels with photocells, something around fifty times this production would be needed—or something around 13,750 tons/day of purified silicon every day for twenty years. For this production to be feasible in terms of energy paybacks, it would be desirable to cut current art silicon purification energy costs by a factor of ten or much more.

Looking at thermodynamic limits, the theoretical energy requirement of silicon purification and wafer fabrication is something less than twice the energy requirement to melt the silicon—something less than 1.5 kilowatt hour per kilogram of silicon, or less than 1% of current energy costs. But the actual history of incremental development has not involved any substantial, sustained effort to converge on these low energy costs, which would involve committing to technology fundamentally different from established patterns. Historical efforts to produce "solar grade silicon" have involved variations on a theme with inherently high energy costs. Proceeding according to this theme, silicon is oxidized to a volatile ($SiCl_4$; $SiHCl_3$; $SiI_4$; $SiH_4$, $SiHCl_3$; $Si_nF_{2n+2}$; $SiHBr_3$; or $SiF_4$) and that volatile is multiply distilled. The purified volatile is then reduced to solid silicon in a reactor. All of these approaches involve energy costs far higher than the thermodynamic limit. The basic silicon volatile distillation and reduction pattern locks in energy costs and capital costs that do not constrain current relatively small scale photocell deployments, but the energy costs of this established pattern rule out the enormous production scales necessary for photocells as a full solution to the world's energy scarcity and global warming problems, where production of tens of terawatts of photocells will be necessary, and will have to be produced within a relatively few years.

If photocells are to practically replace fossil fuels, one of the technical requirements will be a process for purifying silicon with much lower (ideally arguably minimum possible) energy costs, much lower (arguably minimum possible) operating costs, and the capacity for high production rates (up to millions of kg/day). The highest possible silicon purity would be desirable for this process, ideally purity much higher than any available today, to facilitate the maximization of silicon photocell efficiency and to facilitate the minimization of silicon photocell production cost.

Setting the issue of photocell production aside, there is also a significant and ongoing market need to improve the purity-cost tradeoff for semiconductor silicon, and for silicon supplied for metal casting and silicone feedstock production purposes as well.

SUMMARY

The present disclosure provides devices and systems that utilize concurrent and countercurrent exchange platforms to produce purified silicon.

The present disclosure produces a device for purifying silicon. In an embodiment, the device includes a vessel having a top end, an opposing bottom end, and a sidewall extending between the opposing ends and defining a chamber. A silicon inlet is present at a top portion of the vessel for introducing molten silicon into the chamber. A gas injection structure is present at a bottom portion of the vessel. The gas injection structure has a plurality of orifices for introducing a gas comprising oxygen into the chamber. The introduction of the gas produces a plurality of in situ silica-walled oxygen beads in the chamber. The device includes a countercurrent exchange section located between the silicon inlet and the gas injection structure. The countercurrent exchange section includes (1) a controlled downward flow of the molten silicon and (2) a controlled upward flow of the beads. The countercurrent flow between the molten silicon and the silica-walled oxygen beads enables impurities present in the molten silicon to transfer into silica walled oxygen beads to form purified molten silicon.

The present disclosure provides another device. In an embodiment, a device for purifying silicon is provided and includes a vessel having a top end, an opposing bottom end, and a plurality of concentric columns. The columns are in fluid communication with each other. The device includes a central column having a silicon inlet at a top portion of a first column for introducing molten silicon into a bed of a plurality of silica particles to form a slurry. The device includes a first channel in fluid communication with a bottom portion of the central column for receiving a portion of the slurry. The slurry upwardly flows in the first channel. The device includes a second channel in fluid communication with the first channel for receiving a portion of the slurry. The slurry downwardly flows in the second channel.

The present disclosure provides another device. In an embodiment, a device for purifying silicon is provided and includes a vessel having a top end, an opposing bottom end, and a sidewall extending between the opposing ends. The sidewall defines a chamber. The device includes a silicon inlet at a top portion of the vessel for introducing silicon particles into the chamber. The silicon particles have a temperature greater than 1350° C. The device includes an injection structure at a bottom portion of the vessel. The injection structure has at least one orifice for introducing a molten salt composition into the chamber. The molten salt composition has a temperature greater than 1350° C. The molten salt includes an oxidizer dissolved in the molten salt. The device includes a countercurrent exchange section located between the silicon inlet and the injection structure. The countercurrent exchange section includes (1) a controlled downward flow of the silicon particles, and (2) a controlled upward flow of the molten salt composition. The countercurrent flow between the silicon particles and the molten salt composition produces purified silicon particles.

An advantage of the present disclosure is a silicon production system that produces purified silicon at minimal economic cost and/or minimal energy cost.

An advantage of the present disclosure is the production of purified silicon utilizing concurrent and countercurrent selective oxidation solvent exchanges using flow structures similar to exchanges used in packed bed and expanded bed column chromatography.

BRIEF DESCRIPTION OF THE DRAWINGS

FIGS. 1a, 1b, 1c, 1d, and 1e show flow relations with respect to Darcy flow important to understanding the current disclosure. Chromatography involves Darcy flows where the eluent passage length and the transit time for any particular chemical is very uniform. The impurity sorption and complexing necessary for silicon purification involves similar flows, with multiple equilibria closely similar to "heights equivalent to a theoretical plate", but the flow paths can be curved and transit times for different streamlines can vary so long as every streamline involves a large enough number of effective equilibrations.

FIGS. 2a, 2b, and 2c illustrate concurrent and countercurrent silicon-solvent flow using a theoretical plate model, and illustrate that the notion of countercurrent and concurrent exchange makes sense for curved streamlines.

FIG. 4 illustrates the basic low energy purification scheme of the current disclosure, where silicon and solvent are heated above the melting point of silicon, and concurrently and countercurrently contacted above the melting point of silicon so that the impurities transfer to the solvent. The purified silicon is then solidified and cooled, and the impurity-laden slag is disposed of.

FIG. 5 shows a device for purifying silicon in accordance with an embodiment of the present disclosure. The FIG. 5 device streamlines are nearly as well organized as the flows in column chromatography. A source of partly purified molten silicon feeds a countercurrent expanded bed silicon purifier where silicon flows down through an upwardly moving packed or expanded bed of thin walled silica spheres formed in place by bubbling oxygen into the silicon.

FIG. 5A is a sectional view of the device of FIG. 5 taken along line A-A of FIG. 5.

FIG. 5B is a sectional view of the device of FIG. 5 taken along line B-B of FIG. 5.

FIG. 6 shows a top plan view of the device of FIG. 5. FIG. 6 shows the placement of molten silicon inputs, a gas pressure and volume supply for establishing the gas-liquid interface of the interstitial volume between the particles and for softening the particles, for example with steam, and suction points breaking and removing the silica and impurities.

FIG. 7 is a schematic representation of a thin walled spherical silica particle (or bead) formed by bubbling oxygen into the molten silicon of the device of FIG. 5.

FIG. 8 shows a "coarse" purifier in accordance with an embodiment of the present disclosure. In FIG. 8, silica and silicon are mixed and contact concurrently in a buoyancy stabilized Darcy flow. The impurities in the silicon are transferred to the silica during this intimate and prolonged concurrent contact. The silica forms a glassy slag. The glassy slag and the molten silicon are then separated by differential density.

FIG. 8A is a sectional view taken along line A-A of FIG. 8.

FIG. 9 is a sectional view of a countercurrent exchanger in accordance with an embodiment of the present disclosure. In FIG. 9, silica introduced as a slurry and removed as a slurry flows countercurrently with molten silicon to produce a large number of theoretical countercurrent exchanges between the silicon and the silica.

FIG. 9A is a sectional view taken along A-A of FIG. 9.

FIG. 10 is a sectional view of a device for purifying silicon in accordance with an embodiment of the present disclosure. In FIG. 10, a concurrent exchanger similar to the coarse exchanger of FIG. 8 and a countercurrent exchanger similar to FIG. 9 are connected in series in a combined structural form.

FIG. 10A is a sectional view taken along line A-A of FIG. 10.

FIG. 11 is a schematic representation of a device for purifying silicon in accordance with an embodiment of the present disclosure. In FIG. 11, a Darcy flow buoyancy stabilized countercurrent exchange for silicon purification is shown. In FIG. 11, a selectively oxidizing molten salt selectively oxidizes and removes the elements in silicon that form silicides below the melting point of silicon, and also selectively oxidizes and removes from surfaces the elements that diffuse in the silicon crystals rapidly enough to diffuse to surfaces.

FIG. 12 is a schematic representation of a liquid-liquid countercurrent exchange through a packed sapphire bead column with molten silicon as the sapphire nonwetting liquid and a molten salt as the sapphire wetting liquid. The molten salt is a mixture of NaCl, $Na_2S$, $Al_2S_3$ or other salts including enough excess sulfur for a significant partial pressure of sulfur, pS, and enough silicon sulfide partial pressure to inhibit any net silicon oxidation. The high pS molten salt selectively oxidizes and dissolves noble metals from the silicon in an isothermal many HETP exchange. The molten salt is recirculated through electrolytic plates that remove the noble metals from the molten salt so that the recirculated clean solvent supplied to the countercurrent exchange is extremely pure with respect to the noble metals.

FIGS. 14 to 20 are a series of schematic diagrams of purifier components arranged in series for effective purification, each carrying out the basic low energy silicon purification scheme of the present disclosure.

FIG. 14 is a schematic flowchart showing an ultrapurifier arrangement, a melter of relatively pure silicon input, the thin walled silica sphere ultrapurifier, followed by argon deoxidation.

FIG. 15 is a schematic flowchart showing a melter feeding molten silicon to a coarse purifier which feeds molten silicon to a thin walled silica sphere ultrapurifier, followed by argon deoxidation.

FIG. 16 is a schematic flowchart showing a melter feeding molten silicon to a coarse purifier which feeds molten silicon to a countercurrent exchanger similar to that of FIG. 9 which feeds a thin walled sphere ultrapurifier, followed by argon deoxidation.

FIG. 17 is a schematic flowchart showing a melter feeding molten silicon to a coarse purifier which feeds two countercurrent exchangers similar to that of FIG. 9 arranged in series, followed by argon deoxidation.

FIG. 18 is a schematic flowchart showing a melter feeding molten silicon to a coarse purifier followed by a countercurrent molten salt exchange purification stage feeding silicon to a thin walled silica sphere ultrapurifier, followed by deoxidation.

FIG. 19 is a schematic flowchart showing a solid ground silicon purifier followed by a melter which then feeds the molten silicon to a thin walled silica sphere ultrapurifier, followed by deoxidation.

FIG. 20 is a schematic flowchart showing a solid ground silicon purifier followed by a melter which then feeds the molten silicon to a countercurrent exchanger similar to that of FIG. 9, followed by deoxidation.

DEFINITIONS

Figure 3:
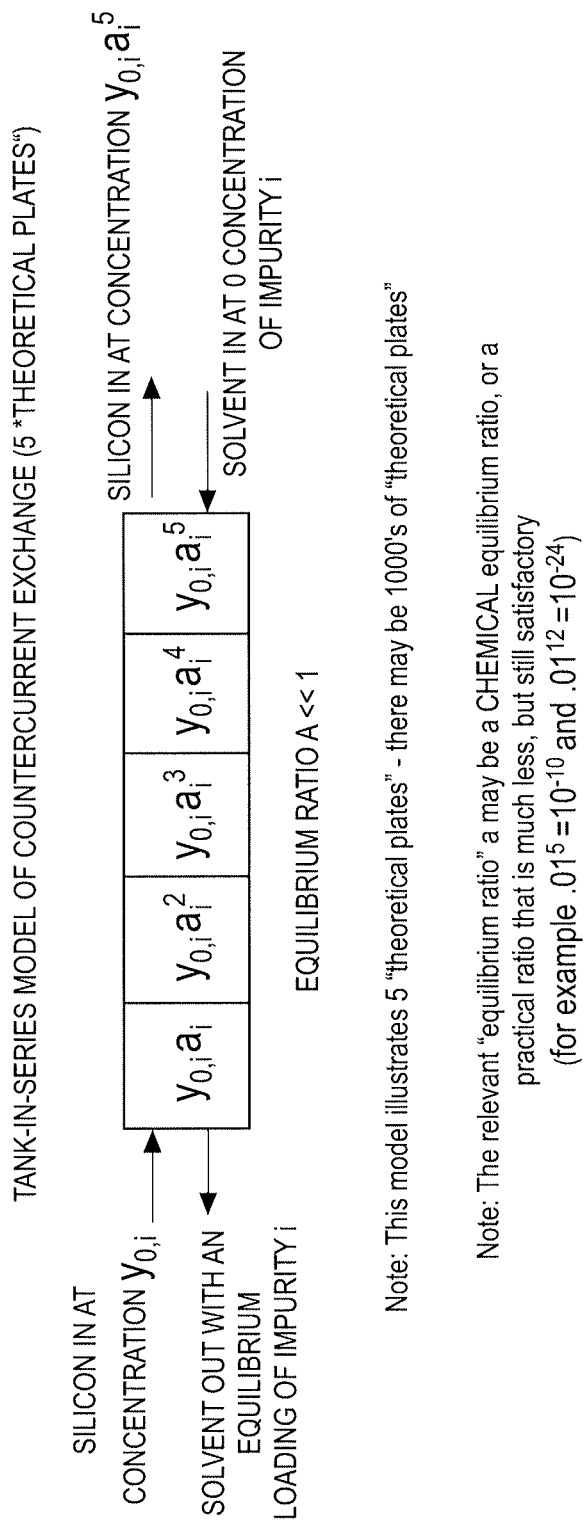
FIG. 3 illustrates the arithmetic of countercurrent purification for a plate model, showing the high purification factors possible with well ordered countercurrent Darcy flows.

Any reference to the Periodic Table of Elements is that as published by CRC Press, Inc., 1990-1991. Reference to a group of elements in this table is by the new notation for numbering groups.

Unless stated to the contrary, implicit from the context, or customary in the art, all parts and percents are based on weight and all test methods are current as of the filing date of this disclosure.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

"Composition" and like terms refer to a mixture or blend of two or more components.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "impurity" in silicon is any element in the periodic table except for silicon. There are 98 natural elements, and in current practice it is reasonable (based on general knowledge, sometimes on analytical information from a vendor, and occasionally on measurement) to assume that any substantial volume of silicon, metallurgical or purified, has some concentration of (some numerically large number of) atoms of all or nearly all of these natural elements.

An impurity concentration in silicon is the molar or weight fraction of this impurity element in a mass of silicon, and for chemical calculations the molar values are more convenient, and used in this paragraph. There are $6.02 \times 10^{23}$ atoms of silicon per mole, so a concentration of the impurities (Na, Ca, Fe, Al, etc) of 1 part per billion would be $6.02 \times 10^{15}$ atoms (of Na, Ca, Fe, Al, etc) in a mole of silicon—a low concentration but still a large number of atoms practically uncountable with real instrumentation. Concentrations of impurity atoms in silicon are measured (in the bulk silicon and at surfaces) by various spectroscopic means, including nondestructive means that measure at surfaces and mass spectroscopy that involves destruction of the silicon sample. The art of silicon impurity measurement is an extensive and advancing art. Detection limits and resolution are subject to continuous improvement because silicon purity is commercially important. Detection limits are generally well below the part per billion level for all the elements in the periodic table and in special cases can be as low as a part per trillion ($6.02 \times 10^{12}$ atoms/mole), still an enormous number of atoms of impurity per mole of silicon. In a very sensitive mass spectroscope ionized stream, individual atoms of identified elements can sometimes be detected one by one, but the number of atoms that can be sampled in this way is small. With field ion microscopy atoms can also be seen one by one, but again, the number of atoms that can be sampled is small.

One can infer concentrations below detection limits (concentrations that have not been and cannot be measured)

reasoning from processes that occur with detectable concentrations and that are understood to occur an atom or molecule at a time, and assuming that these processes continue in the same way according to the same chemical and physical logic when the concentration of an impurity falls below detectable limits. For instance, if a countercurrent purification process working with a source of perfectly pure solvent is understood to occur in a sequence of similar stages, with each stage reducing the concentration of an impurity element j by a factor of $m_j$ then the total purification factor after N stages is $m_j^N$. This arithmetic applies to concentrations that can be measured, and this same arithmetic can be inferred to go on by a logic of extrapolation. The inference follows that the process continues to act in the same way for larger values of N so that it produces purification factors that correspond to concentrations of impurity element j that may be below or far below detectable concentrations. An ideal silicon purifier would in fact reduce all the impurity elements to concentrations far below detectable concentrations in a way that was both practical and fully understood, based on fully understood inferences validated in every way that mattered for practical function. Inferences of lower than measurable concentrations must be based on questionable but often useful logic of model-system correspondence. The validity of such inferences about concentration can be judged by both scientific and engineering logic, including the logic of systems in more-or-less close analogy to the system in question that have been measured or can be measured. The inferences about concentrations can also be checked by measurements on the system involved that are in fact possible and are in fact done. If inferences from a model indicate that an impurity concentration should be well below the threshold of delectability and that impurity is detected, there is something wrong with the assumptions of the model applied to the case in question that may offer guidance in troubleshooting either the model or the apparatus under test.

Molten silicon is elemental silicon in liquid phase, more or less pure or impure. The melting point of pure silicon is 1414° C. Molten silicon has a viscosity and kinematic viscosity roughly similar to those of water at room temperature, so that flow analogies between aqueous flows at room temperature and flows involving molten silicon at temperatures above 1400 C for the same geometries and the same pressure gradients can be close.

Silica is the chemical $SiO_2$ in any form and in any purity that is predominantly $SiO_2$, whether that be sand or a specialized and treated sand such fracking sand, or $SiO_2$ formed by oxidation of silicon, formed by refinement from sodium silicate, or formed by some other chemical process.

A silicate is a composition of $SiO_2$ and other elements. The most common form of silicate is glass. Except for the inert gases, every element in the periodic table can chemically bond with and/or significantly dissolve in silicate glasses. Equilibrium conditions often strongly favor incorporation of an oxidized impurity into a glass, but the process is limited by diffusion. Diffusivities in glassy melts are generally low, and diffusion rates in glasses and glassy slags can be enormously slow compared to many liquids such as water. The viscosity and diffusivity of glasses are closely related and roughly proportional, and both glass viscosity and glass diffusivity are strongly dependent on temperature and composition. Many useful glass compositions are widely used, glasses are widely studied, and glass and glassy silicate slags are used to immobilize and dispose of radioactive waste material that includes every natural element.

Selective oxidation solvent purification of silicon is the process whereby impurity elements in solid or liquid silicon (dissolved in silicon in a chemically reduced form) come into atomic or molecular scale contact with a solvent immiscible in the silicon which oxidizes these impurities without oxidizing the silicon, where the solvent then complexes with or otherwise dissolves the oxidized impurities, carrying these oxidized impurities away from the silicon and therefore purifying the silicon.

Selective oxidation solvents for liquid silicon selective oxidation purification: silica and glassy silicates. Silica and glassy silicates are effective selective oxidizing solvents for molten silicon, serving as both the oxygen source for the selective oxidation and as an effective solvent for the impurities in the molten silicon. Silica and glassy silicates would be nearly ideal for selective oxidizing solvents for silicon except for the extremely low diffusivities that molten silica and molten glasses have, which dictate substantial silicon-silica contact areas, short diffusion distances, extended contact times, and ordered flows for complete and well-ordered mixing. Silica and glassy silicates are immiscible in molten silicon. The silicon-silica contact generates enough oxygen (an equilibrium oxygen concentration $x_o$ of $5.7 \times 10^{-5}$ and a partial pressure, $pO_2$, of roughly $5 \times 10^{-5}$ atmospheres) to oxidize essentially all the impurities in the molten silicon without oxidizing the silicon itself. Research work largely motivated towards radioactive waste disposal has generated electrolytically measured values of the Gibbs free energy of most elements in pure silica and in silica glasses over a wide range of $pO_2$s, and the Gibbs free energy of most elements in molten silicon is also known. Equilibria can be calculated for concentration ratios of impurities between silicon and silica. At the relatively high partial pressures of oxygen in the silicon and silica glass in contact with molten silicon, equilibria favor the silica solvent by enormous factors, with the (oxidized) impurities typically more soluble in the silica or glass than the silicon by factors of millions, billions or much more. Equilibria strongly favoring the glass versus the silicon apply to almost all the elements in the Periodic Table, with the partial exception of copper and the platinum group metals, which are soluble in glasses containing sulfates.

Figure 16:
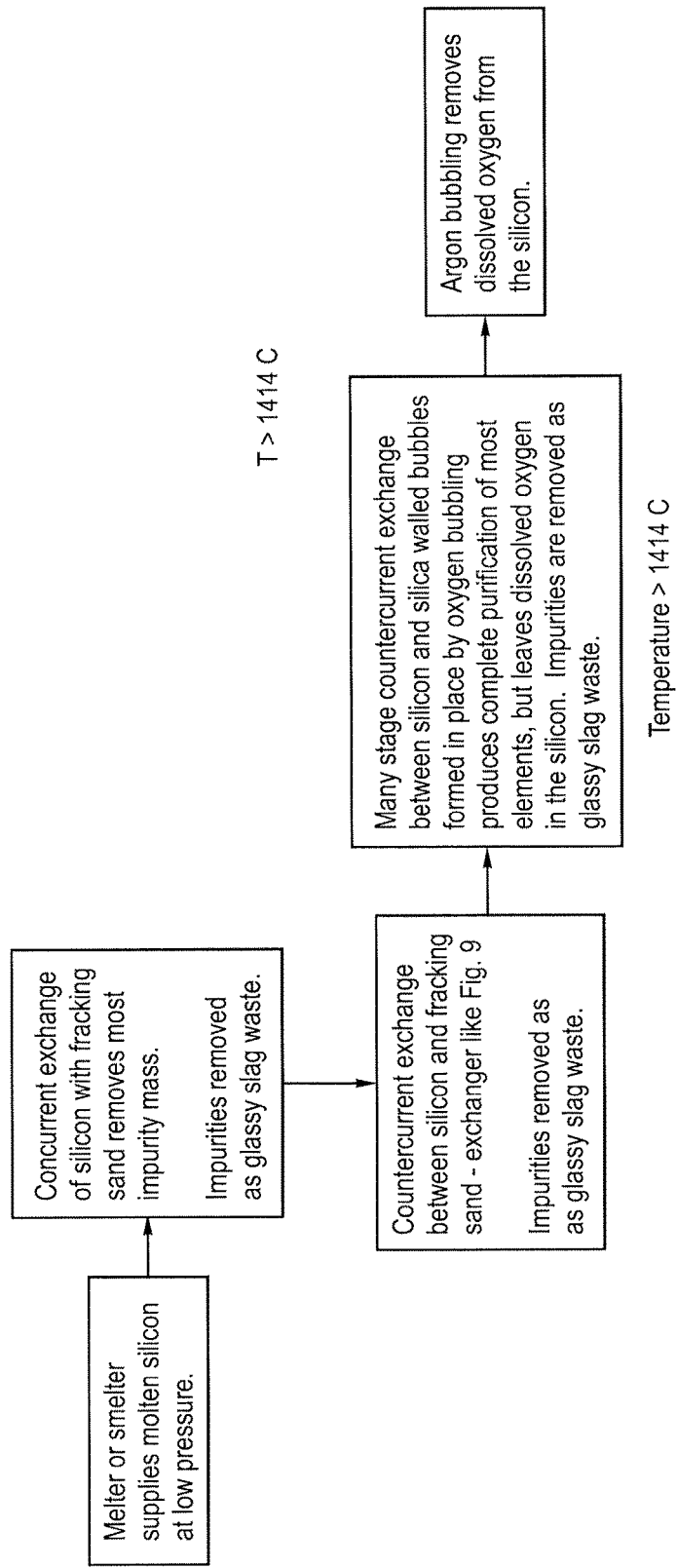
Figure 17:
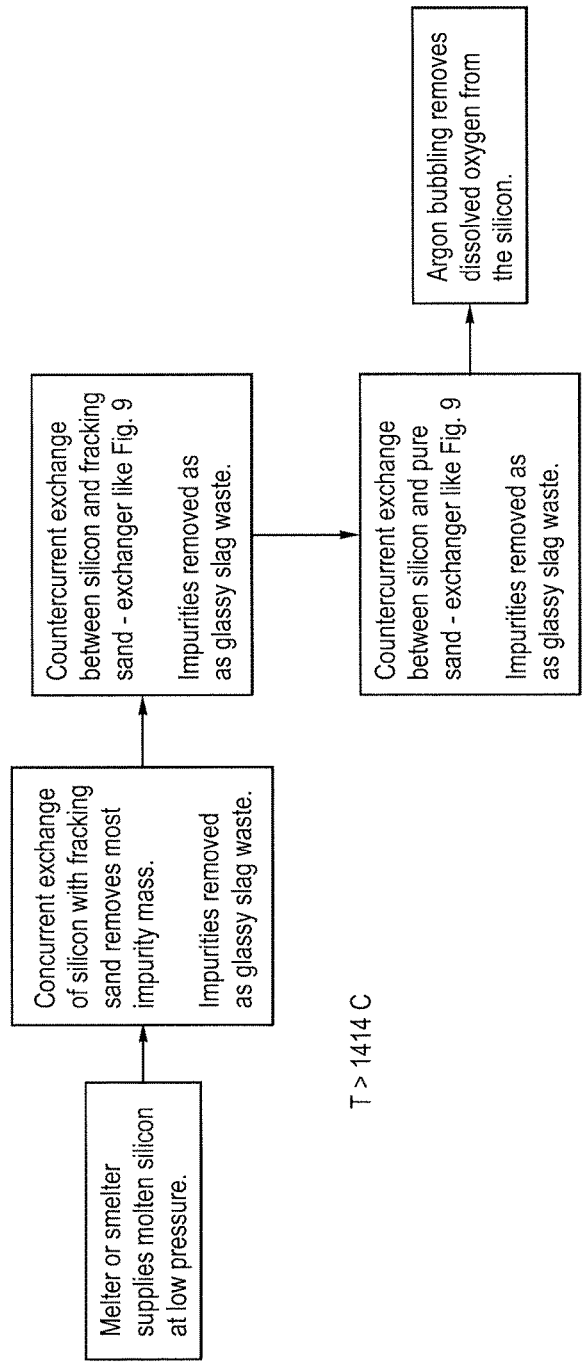

Thermodynamics and phase stability in the Si—O system by S. M. Schnurre, J. Grobner, and R. Schmid-Fetzer (Journal of Non-Crystalline Solids, 336 (2004) 1-25) sets out the basic relations that make the silica-silicon contact an effective oxygen source for selective oxidation of impurities, especially in discussions with respect to Schnurre FIGS. 10, 16, and 17. Schnurre FIG. 10 plots the Gibbs Free energy of amorphous solid silicon monoxide, SiO, compared to a mixture of silicon and $SiO_2$ with the same silicon/oxygen ratio over a range of temperatures including both solid and liquid silicon. An important fact is that amorphous solid SiO is unstable at all temperatures—the stable forms the silicon and oxygen combine into are molten silicon and $SiO_2$. Liquid Si and crystalline or glassy $SiO_2$ (which are thermodynamically quite close) are different phases, and can be usefully considered as phases in analogy with the solid and liquid phases of $H_2O$. At the melting point of silicon, a mixture of Si and $SiO_2$ with a gas phase interface will be in equilibrium with $11.4 \times 10^{-3}$ bar of gaseous SiO (this value may be subject to experimental error, and may change a few percent, but it is taken as a fixed value to emphasize that the phase transition in the Si—O system is as sharp as the water-ice transition in water at 0 degrees C.). At 2300K (610° C. above the melting point of silicon) SiO at the much higher pressure of one bar is at equilibrium with molten silicon and $SiO_2$. Schnurre FIG. 16 plots the Si—O phase diagram showing the gas phase equilibria at 1 bar pressure over a range of temperatures, with $x_o$, the mole fraction of oxygen in the silicon-oxygen system mixture, on the horizontal axis, with $x_o$ ranging from 0 to 1. Schnurre FIG. 17 plots the portion of that Si—O system phase diagram at the extreme left, with the full horizontal scale ranging from $x_o=0$ to $x_o=7 \times 10^{-4}$, and shows a point at $x_o=0.57 \times 10^{-4}$ where Si, $SiO_2$, and gaseous SiO at 0.0114 bar coexist.

The value of $x_o=0.57 \times 10^{-4}$ at 1414 C for the silicon oxygen system can be thought of as a direct analogy to temperature in the water-ice system at 0 C in the presence of saturated vapor. If the temperature goes above 0 C in the water-ice system at standard pressure there is no ice phase. The temperature in a well equilibrated water-ice system cannot fall below 0 C until all the water has turned to ice. The temperature in the equilibrated water-ice system cannot go above 0 C until all the ice has melted. The relations of $x_o$ at a submerged silicon-silica contact are analogous. If $x_o$ in the liquid silicon is less than $0.57 \times 10^{-4}$ in the presence of $SiO_2$, the $SiO_2$ can be thought to melt away—the silicon and oxygen in the $SiO_2$ are both dissolved into the liquid silicon, and this dissolution continues until an $x_o=0.57 \times 10^{-4}$ oxygen concentration is established in the liquid silicon or until the $SiO_2$ phase disappears. For equilibrium going in the other direction, if $x_o$ in the liquid silicon somehow exceeds $0.57 \times 10^{-4}$ (a supersaturated condition) any oxygen in excess of $0.57 \times 10^{-4}$ will transfer (along with a corresponding amount of silicon) to the $SiO_2$ phase.

Darcy flows, where molten silicon flows through silica particles, can be considered as "$x_o$ fixing baths" for molten silicon, in analogy to temperature fixing ice baths. The $x_o$ for such a bath, using pure silicon and pure silica, can be computed directly from the measurements shown in FIG. 2 and FIG. 3 of Oxygen Solubility in Silicon Melt Measured in Situ by an Electrochemical Solid Ionic Sensor by A. Seidl and G. Muller. $x_o$ is fixed at any set temperature, and increases with temperature according to an Arrhenius relation as temperature increases above the melting point of silicon. The partial pressure of oxygen (in the molten silicon and silica glass contact at 1420 C) corresponding to $x_o=0.57 \times 10^{-4}$ is a $pO_2$ that can be computed from the relations of Seidl and Muller. The computed $pO_2$ is roughly $5 \times 10^{-5}$ atmospheres.

Glass is used to immobilize nuclear wastes, and the $pO_2$ values in which different ions of elements dissolve in glasses has been a subject of intense and long-running research, and so the effectiveness of silica and glasses as silicon purification solvents can be reliably calculated working through the process by which the Gibbs free energy of an impurity changes as it diffuses from molten silicon into silica at set values of $pO_2$. A graph plotting the percentage of redox couples in a reduced state for many elements versus $pO_2$ is shown as FIG. 1 in Redox Chemistry in Candidate Glasses for Nuclear Waste Immobilization by Henry D. Schreiber and Angels L. Hockman, J. Am. Ceram. Soc., 70(8) 592-94 (1987). A $pO_2$ of $5 \times 10^{-5}$ atmospheres is well within the processing range for immobilizing impurity elements in glasses. The activities and Gibbs energies of most elements in molten silicon have been measured, and the Gibbs free energies of essentially all the elements have been measured in glass, with many results set out in "A comprehensive electromotive force series of redox couples in soda-lime silicate glass" by Henry D. Schreiber, Nicholas R. Wilk, Jr., and Charlotte W. Schreiber, Journal of Non-Crystalline Solids 253 (1999) 68-75. At a $pO_2$ of $5.0 \times 10^{-5}$ atmospheres, equilibrium favors the glass by large factors for most elements. For iron, the glass is favored by a factor of $2.8 \times 10^{11}$; for nickel, the glass is favored by a factor of $3.5 \times 10^8$. For most other transition elements, and all the group 1 and group 2 elements, the factors favoring the glass are higher.

DETAILED DESCRIPTION

The present disclosure provides silicon purification by a series of concurrent and countercurrent selective oxidation solvent exchanges above 1414° C. Some embodiments utilize Darcy flow structures similar to those used in packed bed and expanded bed column chromatography. Once the total silicon impurity concentration is low enough, complete purification for most or all impurity elements can be accomplished with an orderly expanded bed countercurrent purifier using thin walled silica spheres formed-in-place by oxygen bubbling as the solvent particles, followed by argon bubbling to remove dissolved oxygen (and perhaps dissolved sulfur) from the molten silicon. Earlier stages of silicon purification can be accomplished in many ways. Flowing the molten silicon through a packed bed or expanded bed of silica particles effectively removes most impurity mass. Selective oxidation of silicides and rapidly diffusing impurity elements through a packed or expanded bed of ground silicon between 1350° C. and 1414° C. can also be an effective purification step.

Applicant surprisingly discovered that silica can function both as an oxidizing solvent and as an oxygen source/solvent in the purification of silicon. It also seems likely that most practitioners today will be surprised that mixing limitations with silica or glassy solvents press on design decisions as severely as they do. To many experienced metallurgists and material scientists it will seem unthinkable that SiO is compatible with any relatively high $pO_2$ such as $5 \times 10^{-5}$ atmosphere. Addition of silicon into molten aluminum, iron, or other metals serves as an oxygen getter, and this getter function is the main use for silicon on a mass basis. SiO is silicon with half the oxygen of the fully oxidized form, $SiO_2$, and also acts as an oxygen getter except when it is dissolved in molten silicon. In an Ellingham diagram, the $2 \, SiO+O_2=2 \, SiO_2$ line at 1414 C is about $5 \times 10^{-17}$ atmospheres—extremely reducing. In a similar way, silicon monoxide gas that condenses on silica or a silica glass surface strongly lowers the $pO_2$ of the glass. The addition of silicon and oxygen in a 1:1 ratio decreases the ratio of oxygen to silicon in the silica, which is 2:1, gettering any dissolved oxygen in the silica.

Sorption of a SiO molecule into molten silicon is qualitatively different from sorption of SiO onto any other surface. The additional silicon atom incorporates into the covalently bonded, flawed macromolecule that is the liquid silicon, and does not change its chemical character, even infinitesimally. The oxygen atom in the SiO increases the concentration of oxygen in the silicon, $x_o$, increasing the $pO_2$ of the silicon. A body of silica, immersed in molten silicon at an oxygen concentration $x_o$, but not in direct contact with gas phase SiO, will gain an oxygen fugacity $pO_2$ equal to the $pO_2$ of the molten silicon in which it is immersed.

Complications as silica solvent takes up impurities and becomes silica glass solvent. As silica solvent immersed in molten silicon complexes with the oxides of impurities that form on the glass-silicon interface surface, the silica glass becomes less viscous, diffusivities in the glass increase, and the percentage of silicon oxides compared to other oxides in the glass formed from the silica decreases—which means that some silicon atoms from $SiO_2$ transfer to the liquid silicon, freeing up oxygen atoms to form metal oxides ($Al_2O_3$, MgO, CaO, FeO and $FeO_2$, NiO and others) which dissolve into the glass. Some of these substitution reactions simply follow from the fact that the metals involved have higher free energies of oxide formation on an energy/mole basis than silicon. Metals with these higher energies of formation (including Ca, Mg, Al) typically make up roughly half of the mass of the impurities in metallurgical silicon. Substitution reactions involving these metals will occur with any silica containing slag, regardless of whether that slag is a glass or a much less viscous and much less glass-like liquid. These substitution reactions will occur regardless of $pO_2$ in the silicon and the slag.

The reactions $2\ Al + 3\ SiO_2 \rightarrow 3\ Si + 2\ Al2O_3$; $2\ Ca + SiO_2 \rightarrow Si + 2\ CaO$; $2\ Mg + SiO_2 \rightarrow Si + 2\ MgO$; and many more simply depend on a stronger metal-oxygen bond displacing a weaker silicon-oxygen bond.

However, substitution reactions for the ionized (oxidized) form of many other metals such as Cd, Zn Co, Fe, Se, Sn, Ni, Ti, V, Cr, Cu involve reactions, including these for iron and nickel ($2\ Fe + SiO_2 \rightarrow Si + 2\ FeO$ (complexed in glass); $2\ Ni + SiO_2 \rightarrow Si + 2\ NiO$ (complexed in glass)) that only occur with an extremely viscous glassy slag, and that depend on the high Gibbs energy of solution of these element ions in the glass. This energy of solution in silica and other glasses has been measured, for instance in Schreiber, Wilk, and Schreiber, op cit. and has been used extensively in radioactive waste disposal.

Silica solvent in contact with molten silicon has a complicated and potentially useful relation with sulfates. Sulfate ion solubility in glasses is generally less than 0.6%. If the concentration of sulfate ion is above this solubility limit, sulfate salts form that have low viscosities comparable to water. These sulfate salts are immiscible with both the glass and the molten silicon. Sulfates in both the glass and the salt form can be useful for dissolving metals such as gold, silver, and the platinum metals at a lower $pO_2$ than would otherwise be necessary. Sulfates adsorbed on glassy surfaces can inhibit fusion of different glassy particles suspended in molten silicon that contact each other. It may therefore be useful to add $Na_2SO_4$ or $CaSO_4$ to the silica solvent.

In coarse purification, there are reasons to economize on the mass of silica used per mass flow of silicon, both because the silica costs something (fracking sand now costs roughly 5 cents/kg) and because it takes energy to heat the silica up to the melting point of silicon. There are also advantages to lowering slag viscosity, which complexing with impurities does, and which can also be done by adding additives such as $Na_2O$ or $H_2O$ which soften the glass, because it allows impurity ions to diffuse more rapidly from particle surfaces to the center of the particles. In ultrapurification, where the silica is oxidized directly from purified silicon that could otherwise be sold or used, there is also reason to economize on silica. In both cases there are also advantages in using ample silica. The closer the glass solvent is to pure silica, the easier it is to understand and calculate the solvent.

Selective oxidation solvents for liquid silicon selective oxidation purification: selectively oxidizing molten salts. Some impurity elements, particularly gold, silver and the platinum series metals, oxidize more easily with sulfur than with oxygen. A molten salt (for example a mixture of NaCl, KCl, $Na_2S$ and other salts) with a high enough partial pressure of sulfur and an equilibrium concentration of silicon sulfides can selectively oxidize and dissolve these impurities without net oxidation of the liquid silicon. Molten salts have the advantage that they have much lower viscosities and much higher diffusivities than glasses. Noble metals dissolved in molten salts can be reclaimed by electrolysis, purifying the molten salt for recirculation.

Selective oxidation solvents for solid silicon. Solid silicon has an extremely high oxidation resistance. This oxidation resistance remains high at temperatures close to its melting point (1350-4400° C.), a temperature where many impurity elements have a relatively high diffusivity in the silicon crystal, and a temperature where many impurity elements that react to form silicides form liquid silicides. Molten salts with a high partial pressure of sulfur can oxidize these liquid silicides, and can oxidize impurities that have diffused to the exposed surfaces of silicon crystals, with essentially no oxidation of the crystalline silicon. The molten salt solvent then complexes with or otherwise dissolves the oxidized impurities, carrying these oxidized impurities away from the solid silicon and therefore purifying that solid silicon. Impurities that form molten silicides and impurities that have high solid diffusivities in the silicon can be purified in this way. However, selective oxidation purification of solid silicon is ineffective for low solid diffusivity elements close to silicon on the periodic table, including B, Al, P, and As, because diffusion of these elements in the silicon crystal is so slow that their rate of diffusion to solid silicon surfaces is negligible.

Correspondence between model systems and practical systems in the case of the present disclosure, where some analogies to column chromatography practice are close: Inferences about system purification based on more-or-less complete analogies to column chromatography, and inferences based on chemical and physical calculations based on more-or-less trusted principles, can produce calculated results and calculated concentrations based on models that can sometimes be compared to direct measurements. The models involve mechanical, chemical, and mathematical arguments and descriptions, with equations in particular forms. Variables that can be estimated and plugged into equations yield predictions with numerical values applicable to more-or-less clearly defined contexts. The mathematical form of the models applied to a practical process may not be (and in most cases probably cannot be) exactly correct, and the estimated values of variables, based in turn on fallible measurements, fallible models, and fallible assumptions, may not be (and probably are not) exactly right. Experience shows that models in engineering and science are indispensable for work but experience also shows that they are often misapplied, and often inexact. Experience also shows that some models, applied within limits well tested by experience and measurement, can be reliable enough for well specified practical purposes, and can sometimes show stunning or even arguably perfect accuracy and fit to purpose. The validity of a model is tested by measurements (when the measurements are possible and in fact done). Not everything is measured or can be measured in practical work, but a model system can provide (more or less trusted) guidance to a designer. That model-based guidance can exist at a level of detail that measurements can never provide. If the modeling applied to a design case happens to apply well (and there are innumerable examples where models do work well) this can be powerful guidance.

The present disclosure is in some ways closely similar to column chromatography that has been put into practice millions of times, and analyzed carefully with much checking of theory-practice correspondence over five decades and more. With a frame of geometrical reference on the slowly or intermittently moving particle medium of the present disclosure, as described in the drawings, the multiple pathway Darcy flow of molten silicon around the silica particles of some embodiments can be exactly similar to the multiple pathway Darcy flow of conventional column chromatography or expanded bed chromatography. That multiple pathway flow of molten silicon, and the dispersion of that flow moving down an apparatus, can be modeled with an exact Reynolds number analog of the same apparatus geometry at room temperature with glass beads of the same size as the formed-in-place silica spheres and with water substituting for the molten silicon. With a steady flow of water through the particle bed (for example of 0.4 molar NaCl in water) and a pulsed sample (for example of 0.8 molar NaCl in water) the temporal and geometrical dispersion of the fluid moving through the column can be measured in terms of peak broadening and peak asymmetry in exact analogy to standard and conventional column chromatography testing, for instance according to the procedures set out in GE Healthcare Application note 28-9372-07 AA; Chromatography columns—Column efficiency testing. Assuming negligible or confidently known particle conduction resistance, peak broadening and peak symmetry on this analog test imply conventionally defined HETP values, or equilibrium per unit length values substantially equivalent to HETP values, for the silicon purification apparatus operating above 1414° C. In terms of flow of liquid through a bed of particles the analogy of the purification of the present disclosure to column chromatography is close.

But in another way the purification of the present disclosure is different from conventional chromatography. In conventional chromatography, the ratio of solubility of components being analyzed and separated between the moving medium and the stationary medium, k, is chosen to be relatively small (in the range 2 to 10). The velocity at which different compounds being analyzed move down the column is proportional to $1/(k+1)$ times the rate of carrier liquid moving down the column, so that different compounds with different k's separate in a way useful for analysis. In conventional chromatography elements or compounds being separated travel down the column at rates roughly between ½ and $\frac{1}{10}^{th}$ of the rate of the carrier liquid moving down the column. (The carrier liquid is called the eluent). In analogy, for every one of the 98 natural impurity elements j there is a value $k_j$ for a particular selective oxidation solvent. In one embodiment of the present disclosure, with liquid silicon and a silica or silicate stationary (or slowly moving) solvent medium, values of $k_j$ for many elements j are decades larger than the roughly 2 to 10 size useful for chromatography. (Values of $k_j$ for most or all elements j may be $10^3$, $10^5$, $10^8$ or more.) In another embodiment, where solid ground silicon is the solid stationary (or slowly moving) medium and the liquid is a selectively oxidizing molten salt, values of $k_j$ are many decades smaller than the 2 to 10 range useful for chromatography.

In one embodiment of the present disclosure, the silicon is liquid, the selective oxidizing solvent is silica or a silica glass, and the ratio of solubility of impurities between the molten silicon and the silica solvent strongly favors the solvent, with $k_j$'s in the 100's, 1000's, millions or more for most or all of the impurity elements. The impurity elements complex with the silica solvent and the impurities then move down the column at rates hundreds, thousands or millions of times slower than the rate at which the molten silicon moves, remaining in the silica solvent as the countercurrently flowing silica solvent slowly moves upwards and is slowly removed at the top of the column. In this way impurities transfer from the liquid silicon into the solid or glassy silica solvent and stay there. In a column which can be validly characterized as having N theoretical plates, with a sufficient source of asymptotically pure solvent, the purification factor acting to purify the silicon available for this column will be $k_j^N$. N can easily be in the 100's or 1000's, in which case the numerical value of the purification factor $k_j^N$ can easily exceed the maximum number a hand held calculator can display ($9.999999 \times 10^{99}$). Numerically, this calculation (if it is valid) indicates that there's virtually no chance that even a single atom of impurity element j remains in the purified (liquid) silicon. If the purification factor $k_j^N$ predicts an impurity concentration much smaller than can be detected, and much smaller than any thought to have a technical effect, the exact value of $k_j^N$ is a matter of theory only, and a rough theory, off by a large factor, can be operationally good enough, and indistinguishable from perfect for the purposes at hand.

The notion that there are N discrete theoretical plates in a packed bed or expanded bed column is based on the plate model of chromatography. The model, known to be inexact but useful, has been used for decades because it describes chromatograph peak separation well. The plate model is an approximation of more exact models that have been the subject of thousands of experimental and statistical papers, and the approximation remains useful enough to be dominant for most purposes applied to chromatography. The plate model supposes that the chromatographic column acts as if it contains a large number of separate layers, called theoretical plates. It is important to remember that the plates do not really exist; they are a figment of the imagination that helps people familiar with discrete staged processes understand the continuous processes at work in the column that approximate discrete staged processes in practical effect. In the plate model, the liquid moves down the column by transfer of equilibrated mobile phase from one plate to the next. (This plate model concept is equivalent to a tanks-in-series model reflecting the number of equilibrium stages represented by the column.) It is as if separate equilibrations of the sample between the stationary and mobile phase occur in these "plates", as if each plate was a separate well mixed tank linked to other "plates" directly upstream and downstream in a large series of discrete mixing and transfer steps. In chromatography columns there can be thousands or millions of these "theoretical plates", implicitly defined by the column performance. For silica solvent and most impurity elements in liquid silicon, the equilibrium binding of (oxidized) impurities in the solvent means that the velocity of motion of the impurities in the mobile phase from the relatively stationary silica is substantially zero, or less than the average speed at which the "stationary" phase is removed. In this case the calculated (not measured) purification factor $k_j^N$ can correspond to perfect ("asymptotic") purification—and the purification involved involves no energy input beyond the energy cost of melting the material, the small flow work of moving the silicon through the silica solvent, and the losses involved in preparing and expending the silica solvent.

Inferences about system purification based on more-or-less complete analogies to column chromatography, and inferences based on chemical and physical calculations based on more-or-less trusted principles, can produce calculated results and calculated concentrations based on models that can sometimes be compared to direct measurements. Multistage selective oxidation silicon purification according to the present disclosure involves more-or-less close analogies to chromatography practice. The analogies are closest and seem to be most reliable for the "bubble ultrapurifier" stage where thin walled silica spheres are formed in place by bubbling oxygen through molten silicon and these spheres float upward in a more or less tightly packed bed (which may or may not be expanded so that the spheres do not touch) while evenly introduced liquid silicon flows downward past these silica spheres. The "bubble ultrapurifier" involves moving particles rather than a fixed solid medium, and is a steady-state-steady flow system rather than a batch operating system. In the "bubble ultrapurifier" the silica wall thickness of the particles is generally less than a micron, so that equilibration between silica glass solvent and silicon is fast. The multipath silicon flow motion between the spheres should be exactly similar to that seen in column chromatography (for a moving frame of reference centered on the spheres). The "bubble ultrapurifier"—fed with a molten silicon feedstock with a low enough initial total concentration of impurities (perhaps less than 100 ppm atomic), with its molten silicon feed also purified of corrosive elements such as Ca that would degrade its sapphire container surface, is intended to produce purifications for most or all impurity elements corresponding to concentrations many decades below measurable concentrations. Earlier stages of purification, including a liquid silicon purifier where the silica solvent is solid rounded grains of silica, or a solid silicon purifier using a selectively oxidizing molten salt, will be more complicated to model, and will involve greater modeling uncertainties, because diffusion resistances are far higher. But these earlier stages of purification will involve inputs and outputs where the concentrations of impurities in the silicon are measurable for many or all impurity elements.

The mechanics of the mathematics used in modeling is continuous and differentiable, and in mathematics division of numbers can proceed without limit. But physical material is made up of discrete atoms. To avoid modeling confusions that can otherwise occur, it is analytically and conceptually useful to accommodate this difference by defining the notion of "asymptotic purity" with respect to a particular element as a concentration of less than $1.66 \times 10^{-24}$, a state where the odds that a single impurity element atom per mole occurs is less than one. This "asymptotically" low concentration is a statistical concept only, but it is a conceptually clear and in that sense practical definition of perfect purity. Applied to a purification factor of $k_j^N$ and an initial concentration, there may be uncertainties about the concentration, uncertainties about the value of $k_j$, and uncertainties about the value of N. There may be uncertainties about the model. But it may still seem clear, subject to any available evidence and subject to reasonable estimates that numerical understandings of these things are good enough for reasoned design calculation. It may still seem clear that the product of these factors, even including the uncertainties, is less than $1.66 \times 10^{-24}$ and corresponds to asymptotic purity. In this sense, it may make sense to design a purification system for asymptotic purity with respect to most or all impurity elements. Plainly, such a design procedure will be conservative in the sense that an impurity concentration many orders of magnitude higher than asymptotic purity may be perfect for any practical purpose.

Silicon purification can be done by arranging purifiers in series, with different stages removing different impurities with different effectiveness. Different stages will be subject to different purification specifications. For M different purification reactors in series, for atomic numbers i from 1 to 13 and for atomic numbers i from 14-103 (all the atomic numbers except for silicon, atomic number 14) and for a purification factor $\alpha_{ij}$ for each element in each reactor, we want total impurity concentrations of each of the i elements to be low enough, and ideally asymptotically low. We also want to minimize total silicon losses, and total energy and capital costs. Each purifier stage j will have a purification factor $\alpha_{ij}$ for each element. The design objective of purification is to have the product $$\prod_{\substack{i=1-13 \\ i=15-103 \\ j=1-M}} \alpha_{ij} \times \text{input\_concentration}_{ij}$$

below a working target concentration (ideally asymptotic purity) at the exit of the last ($M^{th}$) reactor for each impurity in the Periodic Table.

Some purification stages (for example, a molten salt stage) may add impurities as well as remove them. The addition of these impurities may be tolerable if the impurities added are readily removed in downstream stages. In general, the set of designs that can meet the objective of adequate (or even asymptotic) purification for every element of the Periodic Table is a large, arguably infinite set. The practical design task, for huge production scales or smaller scales, is to get the desired silicon purification at an acceptable and reasonably small (ideally minimum) cost in a way that the designers and operators adequately trust and understand.

Ordinary metallurgical silicon from the smelter, prior to ladle treatments, has an impurity concentration of roughly 1%, or roughly $10^4$ parts per million atomic. The task of pulling this concentration down from $10^4$ to 100 or 10 ppma may be called "coarse purification." This coarse purification task is qualitatively different, and involves much more impurity mass, than the task of pulling impurity concentrations down from 1 or 10 ppm to concentrations of parts per trillion or less, a task which may be called "ultrapurification". Logically, and practically, the same purifier stage may serve as a coarse purifier for some elements, an ineffective purifier stage for some other elements, and an ultrapurification stage for yet other elements. To design a stage for higher purifications for more elements typically involves added design care and sophistication, which may involve some expense, but this added design care and sophistication may be justified in terms of total plant cost or effectiveness, especially if enormous production volumes are involved.

For instance, ground silicon particles at temperatures near to the melting point of silicon have some impurity elements that diffuse rapidly enough through the solid silicon so that a selectively oxidizing molten salt can remove large fractions of the impurity mass of many elements. As the flow pattern of particles and salt becomes more stable and with more orderly countercurrent character, and as the means to purify the recycled molten salt becomes more effective, a molten salt solid purification stage of this kind may become an ultrapurifier with respect to many elements that diffuse rapidly in crystalline silicon (including the platinum group elements) while having little purification effect on the low sold diffusivity impurity elements (including B and P) near silicon on the periodic table. Design choices on the development of such a solid purification stage will involve the flow teaching of this disclosure, but may also involve design efforts not foreseen or limited by this disclosure, which does show the effectiveness of predictable, high interfacial area, high gradient Darcy flows for the class of such solid phase silicon purifiers.

In another example, putting molten silicon through an expanded bed or packed bed of silica particles that serve as both oxygen sources and solvents for selective oxidation of impurities will work effectively as a course purifier for most impurity elements and for most of the impurity mass in the silicon passed through the silica. This flow structure may also serve inherently as an ultrapurifier for many elements (including Ca, Mg, and Al). With more design sophistication, particularly with the addition of other fluxes to the silica, such a "coarse" purifier section may become a more effective purifier for more elements. Design choices on the development of such a molten silicon—silica solvent purification stage will also involve the flow teaching of this disclosure, but may also involve design efforts not foreseen or limited by this disclosure, which does show the effectiveness of predictable, high interfacial area, high gradient Darcy flows for the class of such molten silicon silica particle purifiers.

FIGS. 1a, 1b, 1c, 1d, and 1e are schematic representations showing flow relations with respect to Darcy flow important to understanding the current disclosure. Chromatography involves Darcy flows where the eluent passage length and the transit time for any particular chemical is very uniform. The impurity sorption and complexing necessary for silicon purification involves similar flows, with multiple equilibria closely similar to "heights equivalent to a theoretical plate" or "HETP," but the flow paths can be curved and transit times for different streamlines can vary so long as every streamline involves a large enough number of effective equilibrations. The embodiments of the present disclosure involve Darcy flows more or less similar to the flows in column chromatography. These flows are much more predictable and homogeneous at the molecular scales where chemistry happens, involve much more rapid and statistically reliable mixing, and are much more useful for purification than the open, eddying mixing flows that occur with liquid silicon in a large scale ladle, or in a crucible, with silicon contact to a flux stirred by various bubbling, inert gas jet, electrical induction, or other stirring contact means. Very incomplete mixing, with surprisingly heterogeneous mixing statistics, is characteristic of turbulent flows. The heterogeneous nature of ordinary turbulent mixing, including the mixing that occurs in prior art silicon purification, is usually invisible to us, but can be visualized clearly in special flow visualization experiments, including many that have produced memorable photographs. Excellent pictures for this purpose are included as FIGS. 162-166 in An Album of Fluid Motion, Assembled by Milton Van Dyke. Perhaps the most vivid is the Album's FIG. 166, taken by Dimotakis, Lye and Papantoniouu, showing mixing in a turbulent jet of dyed water injected into a tank of water. A laser plane illuminates the jet showing the concentration of jet fluid in the plane of symmetry of the jet. Mixing at large scales, and yet more at the molecular scales where chemistry happens, is strikingly incomplete, with big lumps of fluid in the pictured jet practically unmixed. In the Annual Review of Fluid Mechanics, Vol. 37: 329-356 (2005) Paul Dimotakis summarizes basic problems about turbulent mixing, which occurs across a broad spectrum of scales, all much larger than the scale of chemical species diffusion. With enough stirring of initially unmixed liquids, interfacial areas increase, diffusion distances decrease and concentration gradients increase in a turbulent flow, and eventually a stirred volume (for instance a cup of coffee with creamer) approaches molecular scale homogeneity. But the process of turbulent mixing is relatively slow and chaotic at the microscale where chemistry happens, and requires both time and work. Chemists who work to mix liquids to get complete reactions, or who work to dissolve crystals in nearly saturated liquids, know from experience, and almost by reflex, how slow turbulent mixing typically is.

For silicon purification it is important to maximize interfacial areas, maximize concentration gradients, minimize diffusion distances, and important to provide an orderly, statistically predictable contact between the silicon and the solvent. Darcy flows such as those that occur in groundwater aquifers, in various filtration arrangements, and in chromatography, are characterized by extremely large interfacial areas between liquid and the particles the liquid flows through. The concentration gradients between liquid and particles are high because the diffusion distances between liquid and particles are small. Before equilibrium is reached, the concentration gradients within the particles are large because the particles are small. If the particles are thin walled, equilibration can be yet faster. Orderly, statistically predictable contact between the silicon and the solvent can be arranged in Darcy flows.

FIG. 1a is a sketch of Darcy flow of a liquid moving through particles where the liquid and particles have flow velocities. The liquid and the particles each have a mean velocity, and can be flowing in the same or opposite directions. The sketch is useful for some simple definitions. Is the liquid and particle flow moving in the same direction (concurrent) or moving in opposite directions (countercurrent). Is one of the media stationary? Does the flow force exerted by the liquid moving through the particles act to compress the particles or separate the particles? Do the flow forces on the particles reinforce or oppose buoyancy forces? Concurrent flows, countercurrent flows, flows where buoyancy opposes flow motion and flow motion can separate the particles, and flow fields where drag forces and buoyancy both compress the particles can all be useful for silicon purification. Darcy's law for flow through porous media or particles is similar to Ohm's law for electricity, and is $$Q = \frac{\kappa A (p_b - p_a)}{\mu L}$$

where $\kappa$ is the permeability per unit area and $\mu$ is the viscosity. FIG. 1b shows a sketch corresponding to the definition, illustrating a circumstance where flow streamlines of a liquid through a particle packed tube are straight and uniform.

FIG. 1c shows a schematic representation of a column having N theoretical plates dividing the column length, a tanks-in-series model that is conceptually useful and widely used in chromatography. The figure illustrates the idea of "heights equivalent to a theoretical plate" or "HETP" which is useful and widely used in chromatography, countercurrent exchange, and elsewhere. The analogy is useful for discussion of what happens in a chromatography column or in the Darcy flows of the present silicon purification disclosure. FIG. 1e is similar to FIG. 1c and illustrates a length equivalent to a theoretical equilibrium for a curved path or passage.

For chromatography it is vital that the rate of elution of a chemical being separated be exactly uniform through all eluent streamlines of the column, so that transit times through the column are tightly distributed and separation occurs. This spatial uniformity is not necessary for purification, which has the objective of sorbing, complexing, and removing all the impurities into a solvent stream rather than separating these impurities spatially for analysis. Curved passages without uniform streamline lengths are acceptable for the absorption and chemical complexing purification used in silica purification of silicon. For a packed bed, the length equivalent to a full equilibration between the flowing liquid and the surface of the particles (for instance, for the reversible adsorption desorption of chromatography) is typically about 3 mean particle diameters for commercial chromatography packings and materials (GE Healthcare Application note 28-9372-07 AA; Chromatography columns—Column efficiency testing: "Optimal column efficiency typically corresponds to an experimentally determined reduced plate height of h≤3 for the porous media employed in bioprocess chromatography".) The length for equilibration between liquid and particle surfaces for silicon purification according to the present disclosure will be similar (3-5 mean particle diameters) for reasonably packed flows with curved or straight flow paths. For purification, flow path uniformity and transit time uniformity through the silica glass sorption bed is not essential. What is essential is that the number of equilibrium sorptions is sufficiently large for all the streamlines through which the silicon passes.

FIGS. 1a-1e do not illustrate all the characteristics of Darcy flow (which have been set out extensively in vector or tensor form elsewhere) but the figures do illustrate questions relevant to the silicon purification designs of the present disclosure, questions that apply to large scale patterns and to smaller scale volumes of the flow. Key questions are:

Is the direction of the particle flow and fluid flow the same or different?

Is the direction of buoyancy force and particle drag force the same or different?

What path length corresponds to an "equilibrium length" or single HETP length for the particles, composition, and packing were these particles in a chromatography column? (This length should be in the range from 3 to 10 average particle diameters.)

What is the minimum number of "equilibrium lengths" a molecule of silicon passes through moving through a purifier? For purification the minimum path length is much more important than the average number of path lengths. To economize on solvent, it is desirable for the distribution of flow lengths (and therefore the solvent loading) to be fairly uniform.

How do the flow streamlines of fluid flow and particle flow fold together? Is it a countercurrent flow where the highest purity is approximately the same as the purity possible if the silicon were washed with an infinite source of clean solvent. Or is it concurrent flow, with at most one chemical equilibrium stage possible?

How clean is the solvent source in the ways that matter for purification? (Each impurity element counts as a separate impurity and at low impurity concentrations in the solvent these element by element concentrations are essentially independent.)

These simple questions, which can be easily asked and answered for a particular flow, will clarify the function of the current disclosure purifiers, which all utilize Darcy flows or flows closely approximating Darcy flows, with strong diffusive coupling between liquid and solid surfaces, with extremely large interfacial surface areas, and with relatively short diffusion distances within the particles.

Applicant discovered that Darcy flow principles can be applied to systems for silicon purification. The intense, fine scale observation that skilled chemists often give to chromatography can be applied to silicon purification employing Darcy flows, as well.

The objectives of silicon purification and chromatography, and the functional details involved, are similar in essential ways, and different in others. The purpose of chromatography is to separate (un-mix) two or more initially mixed compounds so that these compounds are separated in space. The separation can occur because the ratio of affinity of the compounds to the fixed and moving media differ, so that they move down the column at different rates. All compounds move down the column at the same rate when they are actually dissolved in the eluent liquid. But molecules of different compounds spend a different fraction of their time sorbed onto the stationary medium particles, so the average velocity varies from compound to compound. For this separation to be happen sharply enough to be useful, the flow path lengths for all the fluid elements (or tracer compounds) passing through a chromatography column have to be as tightly distributed as possible, so that all of a particular tracer (or compound being separated) injected into a column at the same time pass out of the column (or cross the same line or the same plane) at nearly the same time. The chromatogram is a mapping of concentration (or some measure of concentration) versus time.

For silicon purification, no such mapping is involved and that chromatographic spatial detail and that more-or-less exact streamline alignment is unnecessary. All that's needed is that each fluid element path includes enough equilibrations for (ideally perfect) purification. Each equilibrium strongly favors sorption in the silica or glassy solvent. The more equilibria the better the purification.

FIGS. 2a, 2b, and 2c illustrate notions of countercurrent exchange and concurrent exchange between solvent and silicon, which are important for effective silicon purification according to the present disclosures, and closely correspond to and provide detail with respect to the tank-in-series "theoretical plate model" described in FIGS. 1d and 1e.

In the concurrent silicon-silica flow modeled in FIG. 2a, liquid silicon and silica particles flow in the same direction, and FIG. 2a illustrates 30 separate "theoretical plates" along the contact. (In the real case being modeled, the silica and silicon equilibrate continuously, as illustrated in FIG. 1c.) In a concurrent flow like this, the silicon and solvent can only equilibrate once—if full equilibration is achieved in the first "plate" no further separation occurs on the following 29 plates. If effective equilibration is much slower, a full chemical equilibration (which depends not only on chemistry and on diffusion between the silicon and the particle surfaces, but also on the diffusion from the particle surfaces into the particle) may not have occurred over the full 30 contacts. The coarse purification in the purifier of FIG. 8 is concurrent flow like this, and for this coarse purifier less than a full chemical equilibration between silicon and silica would constitute satisfactory coarse purification.

FIG. 2b shows a plate model with countercurrent silicon-solvent flow, with the silicon and the solvent flowing in opposite directions. As in the case of FIG. 2a, there are 30 "theoretical plate" divisions illustrated. In a countercurrent flow like this, under conditions where diffusion is fast enough so that chemical equilibration occurs in each "plate", there are 30 equilibrations in series. As described in more detail in discussions of FIG. 3, this countercurrent arrangement permits enormously more complete separation if the solvent remains well away from saturation and if diffusion between the silicon and the silica solvent is fast enough. The purification involved depends on well ordered flows that occur in Darcy flows, and that can occur in carefully designed packed columns for liquid-liquid extraction, but cannot occur for the ordinary turbulent conditions characteristic of prior art solvent based silicon purification.

FIG. 2c illustrates the idea that the notions of countercurrent exchange and concurrent exchange make sense for curved streamlines as well as straight streamlines.

The following relations apply to a countercurrent purification arrangement to the extent that the flow arrangement contains (or can be well approximated by) ideal countercurrent exchanges and the silicon has been coarsely purified so that the impurity concentrations in the solvent remain low enough so that the equilibrium silicon-solvent ratio remains constant for each impurity element. If an ideal countercurrent exchange between silicon and a solvent is arranged for a particular $i^{th}$ element, after such a coarse purification, there is a Nernstian (constant) equilibrium separation factor $\alpha_i$ between the silicon and the solvent. A number N of countercurrent exchanges occurs. As the silicon flows through the countercurrent exchanges along the exchanger, the number of exchanges goes from 0 at the start to N at the exit. The finite increment approximation formula for purification after n exchanges is shown in Formula (1) below $$y_{n,i} = y_{0,i}\alpha_i^n + \alpha_i x_{0,i} \quad \text{Formula (1)}$$

where $$\alpha_i = \frac{\text{equilibrium concentration in the silicon}}{\text{equilibrium concentration in the solvent}}$$

for the $i^{th}$ element in the silicon,
 $y_{n,i}$ is concentration of the $i^{th}$ element in the silicon after n exchanges,
 $y_{0,i}$ is concentration of the $i^{th}$ element in the silicon at the entrance of the exchanger (at 0 exchanges),
 $x_{0,i}$ is concentration of the $i^{th}$ element in the solvent entering the exchanger, and
 n is the number of theoretical equilibrium exchanges counting along the exchanger from the entrance of the silicon.

For a particular exchanger there are i such sets of equations, one for each impurity element. The countercurrent exchange model above assumes $\alpha_i$ is much less than 1; assumes that the number of theoretical exchanges in the countercurrent exchanger, N, is much greater than 1; and assumes that the impurity concentration of the available input purification solvent $x_{0,i}$ is extremely low, and ideally 0. In such a case, for sufficiently small $\alpha_i$ and sufficiently large N, the countercurrent purification of the silicon for the ith element with a perfectly pure solvent ($x_{0,i}=0$) can produce asymptotic purity. However, the purity of the silicon in the exchanger, $y_{n,i}$, can never fall below $\alpha_i x_{0,i}$.

FIG. 3 illustrates such a countercurrent exchange for 5 stages (theoretical plates) on the assumption of perfect input solvent purity, where $x_{0,i}$ and therefore $\alpha_i x_{0,i}$ equal zero. With an initial impurity concentration of $y_{0,i}$ the concentration after 5 exchanges is $y_{0,i}\alpha_i^5$. For silicon and silica and most impurity elements, the relevant concentration ratio $\alpha_i$ will be much less than 0.01, and $\alpha_i^n$ will be an extremely small number, approaching 0 in the limit as N becomes large. The model illustrates 5 "theoretical plates" but a real purifier may have many 100s of theoretical plates for any streamline path through which the silicon passes for purification, providing much higher purification then the 5 plate case illustrated. Equilibrium between liquid flows and particle surfaces for the kinematic viscosity of molten silicon (which is similar to that of water at 20° C.) is fast enough so that a "theoretical plate" will be in the range from 3 to 5 mean particle diameters. Taking that number at 5, and the particle diameter at 200 microns, a "theoretical plate" will be a millimeter, ten centimeters will be 100 "theoretical plates". The value of $\alpha_i$ for iron in equimolar silicon and silica will be about $4\times10^{-12}$, and $\alpha_i^5$ will be less than $10^{-57}$. The computed values $\alpha_i^{20}$ or $\alpha_i^{50}$ swamp a hand calculator display, and calculated equilibria values for most other elements are even smaller than the one for iron. Countercurrent exchange, with the high degree of flow order that occurs in Darcy flows, has the theoretical potential to produce asymptotic purification of most impurity elements in metallurgical silicon. (Asymptotic purification could never be measured, and is an unnecessarily high and probably unattainable standard. The point is that countercurrent exchange has the potential to produce any degree of purification needed for any impurity element i if values of $\alpha_i$ less than 0.1 can be found.)

FIG. 4 summarizes the basic low energy silicon purification scheme of the present disclosure, which involves a well insulated and ideally adiabatic process that heats solvent (silica and additives) and silicon above the melting point of silicon (1414° C.), that contacts the silicon and solvent(s) concurrently and countercurrently with highly orderly flows (ideally Darcy flows) above 1414° C., to remove the impurities from the silicon and transfer these impurities to the solvent, means to collect the impurity-laden slag produced by the silicon-solvent contact above 1414° C. and dispose of it at a lower temperature, and means to solidify and cool the silicon. Setting heat losses aside (and system insulation is a major, separate challenge not treated in this disclosure) and assuming a source of "pure enough" silica solvent, the energy cost of purifying the silicon would be no more than the energy cost of melting the silicon and heating the silica solvent to the molten silicon temperature. This is less than $\frac{1}{50}^{th}$ the energy cost of current silicon purification. The basic point is that for an adiabatic (no net heat transfer) system, the theoretical energy requirement to purify silicon (even to asymptotic purity) according to the pattern of FIG. 4 is little more than the energy cost to melt the silicon and heat the solvent. Extremely high purifications (even asymptotic purifications) are possible because the formula for chemical equilibrium $\Delta G_i = -RT \ln K$ expresses equilibrium for a particular element i as a ratio K. If equilibrium can be achieved at every stage, one stage of equilibrium purification exchanging with a perfectly pure solvent reduces the concentration by a factor of K. Transferring the purified material from this stage, and exchanging again with a perfectly pure solvent reduces the concentration by another factor of K, for a total purification factor of $K^2$. Additional stages increase purification by factors of $K^3 \ldots K^4 \ldots K^5$ and so on. Countercurrent exchange, of the well-ordered sort possible with Darcy flow, produces this kind of purification arithmetic. A point comes where the limiting factor is the purity of the solvent available. In the purification arrangement of FIG. 5, the solvent is oxidized from the purist silicon available, the purified silicon below the countercurrent exchange.

The basic formula for purification for any impurity element i is $y_{n,i} = y_{0,i}\alpha_i^N + \alpha_i x_{0,i}$ where N is the number of equilibria. The greater the value of N for any particular fluid path, the greater (and safer) the purification will be for that path, but the exact value of N, if it is large enough, doesn't matter. It is not necessary that each fluid path involves the same N, or involve the same transit time.

The spatial neatness of a well packed chromatograph column may be useful for a silicon purification arrangement using Darcy flows—it facilitates testing in analogy to the well established testing of chromatography practice—but it is not functionally essential.

The present disclosure provides a device for purifying silicon. In an embodiment, the device includes a vessel having a top end, an opposing bottom end, and a sidewall extending between the opposing ends and defining a chamber. A silicon inlet is present at the top portion of the vessel for introducing molten silicon into the chamber. A gas injection structure is present at a bottom portion of the vessel. The gas injection structure has a plurality of orifices for introducing a gas comprising oxygen into the chamber. The gas is introduced in the form of bubbles, where introduction of the gas bubbles into the molten silicon oxidizes silicon at the outside of the bubbles and produces a plurality of in situ silica-walled gas filled beads in the chamber. The device includes a countercurrent exchange section located between the silicon inlet and the gas injection structure. The countercurrent exchange section includes (1) a controlled downward flow of the molten silicon and (2) a controlled upward flow of the beads. The countercurrent flow between the molten silicon and the silica-walled gas filled beads provides intimate high area contact between the downflowing molten silicon and the up-flowing beads that enables impurities present in the molten silicon to transfer into the up-flowing silica walled gas filled beads so that the downflowing molten silicon is purified.

In an embodiment, a device for purifying silicon 10 is provided and includes a vessel 12 having a top end 14, an opposing bottom end 16, and a sidewall 18 extending between the opposing top and bottom ends and defining a chamber 20 as shown in FIGS. 5, 5a and 5b. The vessel 12 is made of a material that is inert, or substantially inert, to molten silicon. Nonlimiting examples of suitable material for the vessel include sapphire and graphite.

The device 10 includes a silicon inlet 22 at a top portion of the vessel 12 for introducing molten silicon 24 into the chamber 20. The device 10 includes a gas injection structure 26 at a bottom portion of the vessel 12. The gas injection structure 26 has a plurality of orifices 28 for introducing a gas into the chamber. The gas includes oxygen. The introduction of the gas produces a plurality of in situ silica-walled oxygen beads 30 (hereafter "beads" 30) in the chamber 20. The device 10 includes a countercurrent exchange section 32 located between the silicon inlet 22 and the gas injection structure 26. The countercurrent exchange section 32 includes (i) a controlled downward flow of the molten silicon 24 as shown by arrow 34; and (ii) a controlled upward flow of the beads, as shown by arrow 36.

In an embodiment, an annular member 43 extends through the chamber 20. The annular member 43 is operatively connected to the gas injection structure 26. The annular member 43 includes an inner conduit 43a (FIG. 6) operatively connected to a gas source (not shown). The inner conduit 43a delivers the gas to the gas injection structure 26. The gas injection structure 26 includes a hub 44 and plurality of spokes 46 extending radially from the hub as shown in FIG. 5b. Each spoke 46 includes a plurality of small gas insertion tubes that inject gas into the bubble section 38. The small gas insertion tubes constitute the orifices 28. In the bubble section 38, the rising gas from the spokes 46 contacts downward flowing molten silicon 24 and a silica wall forms around the gas to form the beads 30.

FIG. 7 shows a portion of a bead 30. Each bead 30 is hollow and contains oxygen and optionally one or more additional gasses. Nonlimiting examples of suitable additional gasses include argon and sulfur dioxide. In an embodiment, the gas includes oxygen and from 0.01 mol % to 0.1 mol % $SiO_2$ and/or from 0.01 mol % to 0.1 mol % argon. Hence, the spokes can inject oxygen and optional additional gasses into the bubble section 38. Each bead 30 includes a silica wall 31 that forms as a result of the interface between the oxygen gas and the molten silicon 24 that occurs in the bubble section 38. The thickness of the silica wall 31 is from 0.1 microns, or 0.2 microns, or 0.3 microns to 0.4 microns, or 0.5 microns, or 0.6 microns, of 0.7 microns, or 0.8 microns, or 0.9 microns, or 1.0 micron. The beads 30 have a D50 from 25 microns, or 50 microns, or 100 microns to 200 microns, or 300 microns, or 400 microns, or 500 microns.

In an embodiment, the beads 30 can oxidize and consume from 0.5 vol % to 1.0 vol % of the molten silicon introduced into the device 10.

The molten silicon 24 introduced into the device 10 has an impurity concentration that is lower than the impurity concentration for metallurgical silicon, such as a total impurity concentration of less than 200 ppm, or less than 100 ppm, or less than 20 ppm. If the molten silicon 24 has too high a concentration of impurities, the molten silicon may chemically degrade the device container or saturate the silica walls 31 of the beads 30. In an embodiment, the molten silicon 24 contains less than 10 ppm molar total impurities from alkaline earth metals and alkali metals.

In an embodiment, the molten silicon 24 introduced into device 10 has a purity of at least 99.99%.

From the bubble section 38, the beads 30 rise and enter the lower portion of the countercurrent exchange section 32. The countercurrent exchange section 32 has a volume and the volume includes a packed bed 40 of beads 30 and interstitial molten silicon 24.

The equilibria strongly favor transfer of the impurities from the molten silicon 24 to the silica wall 31. Equilibrium between the molten silicon 24 and the silica wall 31 for the beads 30 is rapid enough so that the exchange relations within the counter-current exchange section 32 represent 100-fold HETP exchanges. The thinness of the silica wall 31 (0.1-1.0 microns) for beads 30 yields a large interfacial area per unit silica volume, with short diffusion distances for equilibration in the beads 30. Molten silicon 24 flowing downward through the countercurrent exchange section 32 is in intimate diffusional contact with the beads 30, similar to a fluid passing through a packed chromatography column. However, unlike the stationary phase of a conventional chromatography column, the beads 30 are not stationary. Rather, the beads 30 move, or otherwise float, upward from bubble section 38 and form a packed bed 40 in the countercurrent exchange section 32. The packed bed 40 slowly floats upward and impurity-containing beads 30 are slowly removed at the separation section 42 of the chamber 20.

Impurities that are present in the molten silicon 24 diffuse into, or otherwise are adsorbed by, the silica wall 31 of the beads 30 as the molten silicon flows through the countercurrent exchange section 32. The transfer of impurities to the thin silica-wall gas filled beads transforms the beads into "glassy" beads. Bounded by no particular theory, it is believed the countercurrent exchange section 32 with the packed bed 40 and interstitial molten silicon 24 therebetween forms a separation column with 10's, or 100's, or 1,000's of height equivalent theoretical plates (HETPs), yielding a purification factor from $10^4$ or $10^6$ to $10^{10}$ or more. In this way, device 10 is capable of producing ultrapure molten silicon.

In the countercurrent exchange section 32, the downward flow 34 of the molten silicon 24 is a controlled flow. The downward flow 34 is controlled, or otherwise determined, by adjusting the rate and the amount of molten silicon that is introduced into the top of the chamber 20. The upward flow 36 of the beads 30 is a controlled flow. The upward flow 36 is controlled, or otherwise is determined, by the amount and rate of gas injected into the bottom of the chamber 20 and the amount of resultant beads 30 formed therefrom.

In an embodiment, the controlled downward flow 34 of the molten silicon 24 moves through the counter-current exchange section 32 at a rate from 0.1 millimeter (mm)/second (s), or 0.5 mm/s, or 1.0 mm/s, or 2.0 mm/s, or 3.0 mm/s, or 4.0 mm/s, or 5.0 mm/s to 6.0 mm/s, or 7.0 mm/s, or 8.0 mm/s, or 9.0 to 10.0 mm/s.

In an embodiment, the controlled upward flow 36 of the beads 30 moves through the counter-current exchange section at a rate from 0.1 millimeter (mm)/second (s), or 0.5 mm/s, or 1.0 mm/s, or 2.0 mm/s, or 3.0 mm/s, or 4.0 mm/s, or 5.0 mm/s to 6.0 mm/s, or 7.0 mm/s, or 8.0 mm/s, or 9.0 to 10.0 mm/second.

In an embodiment, the countercurrent exchange section 32 exhibits a "steady-state/steady-flow" condition whereby (i) the net rate at which beads 30 are supplied at the lower end of the countercurrent exchange section 32 and form the packed bed 40 is the same as, or substantially the same as, (ii) the net rate at which beads 30 are removed from the upper end of the countercurrent exchange section 32 by way of the separation section 42. In this sense, "steady-state/steady-flow" at the top of the chamber is steady or uniform, or substantially steady. In other words, "stead-state/stead-flow" is achieved in the countercurrent exchange section 32 because as the packed bed 40 floats upward, the molten silicon 24 is evenly supplied at the top of the chamber 20 and flows evenly downward in a Darcy flow through the packed bed 40 (similar to the flow that occurs in conventional column chromatography). The (i) evenness and uniformity of packed bed formation at the lower end of the countercurrent exchange section 32, in conjunction with (ii) the evenness and uniformity of the introduction of molten silicon 24 at the top of the chamber 20, along with (iii) the evenness and uniformity of the removal of the beads 30 at the separation section 42 the top of the countercurrent exchange section 32 produces the steady-state/steady-flow condition. The steady-state/steady-flow condition ensures that the molten silicon passing through the bed 40 travels through a large number of equilibrium contacts.

In an embodiment, the rate for the downward flow 34 is the same as, or substantially the same as, the rate of the upward flow 36.

In an embodiment, the countercurrent exchange section 32 includes from 25 vol %, or 30 vol % to 40 vol %, or 50 vol % molten silicon 24 and from 75 vol %, or 70 vol % to 60 vol %, or 50 vol % beads 30.

In an embodiment, the counter-current exchange section 32 has a "plate height" of 3 diameters, and the beads 30 have about 28 HETP's. The beads 30 have a D50 from 100 microns, or 200 microns, or 300 microns, or 400 microns, or 500 microns to 600 microns, or 700 microns, or 800 microns, or 900 microns, or 1000 microns yielding a counter-current exchange section 32 having from 300, or 400, or 500, or 600 to 700, or 800, or 900, or 1000 theoretical plates.

In an embodiment, the countercurrent exchange section 32 has from 300, or 400, or 500 to 600, or 700, or 800, or 900, or 1000 HETPs.

FIG. 6 shows a sectional view of the vessel 12 just below the silicon inlet 22. In an embodiment, the silicon inlet 22 includes a plurality of silicon injection tubes 48 (or "SITs 48") uniformly spaced-apart as shown in FIGS. 5, 5a, and 6. The SITs 48 extend through the separation section 42 such that the outlet for each SIT 48 is located at the upper portion of the countercurrent exchange section 32 for the uniform introduction of molten silicon 24 into the countercurrent exchange section 32. Each SIT 48 includes a plurality of silicon injection holes 50 extending radially from the center of each SIT 48. Although FIG. 6 shows each SIT 48 having six silicon injection holes 50 (for a total of 396 silicon injection holes), it is understood each SIT 48 may have 2, or 3, or 4, or 5 to 6, or 7, or 8, or 9, or 10, or more silicon injection holes 50. Introduction of the molten silicon 24 through the SITs 48 uniformly fills the interstitial volume between the individual beads 30 of the packed bed 40. The molten silicon 24 flows downward evenly as the beads 30 of the packed bed 40 flow upwardly, the opposing flows thereby providing "countercurrent flow" in the countercurrent exchange section 32. By the time that the downward-flowing molten silicon 24 has moved several times the distance between the injection tubes, the downward flow of silicon through the packed or buoyancy expanded silica bed is uniform, or substantially uniform, producing a countercurrent Darcy flow geometry similar to that of column chromatography.

FIG. 6 shows an embodiment wherein a plurality of spaced-apart ports 52 and a plurality of spaced-apart extraction ducts 54 are present in the separation section 42. The ports 52 introduce a media gas into the separation section 42. The media gas imparts a positive pressure to hold or otherwise, maintain the packed bed 40 of beads within the countercurrent exchange section 32. The media gas promotes separation of the beads 30 from the molten silicon 24. The introduction of the media gas provides a balancing pressure, which in turn, provides an interface between the separation section 42 with the upper surface of the packed bed 40. In the separation section 42 and above the top surface of the packed bed 40, the interstitial volume between the beads 30 is the media gas. Below the interface, the interstitial volume is filled with molten silicon 24. The media gas is a noble gas (such as argon, for example) or a relatively unreactive gas such as nitrogen, and may optionally include some hydrogen and/or steam to soften the silica bead walls.

The beads 30 form a foam when they enter the separation section 42. The device 10 includes extraction ducts 54 to remove the impurity-containing ("glassy") beads as the beads rise to the top of the counter-current exchange section 32 and form the foam in the separation section 42. Removal occurs by way of negative pressure or suction. The media gas with hydrogen and/or steam advantageously softens the silica walls of the beads 30 promoting efficient removal of the glassy beads through the ducts 54 via suction or vacuum.

The vessel 12 includes a well 56. The well 56 is located below the gas inlet structure 26. The well 56 collects the molten silicon that has passed through the counter-current exchange section 32. The molten silicon 24 collected in the well 56 is purified molten silicon. In an embodiment, most of the impurity elements in the purified silicon will be at such low concentrations as to be undetectable, or less than one part per trillion.

In an embodiment, the well 56 is in fluid communication with a deoxidation column. The purified silicon is delivered to the deoxidation column to remove oxygen therefrom. A nonlimiting example of a suitable deoxidation column is an argon bubbler as shown and described in FIG. 13.

FIG. 8 shows another device for purifying silicon. In an embodiment, FIG. 8 illustrates a "coarse" purifier 80 that can produce less than 1 full equilibration contact between metallurgical (or "less pure") silicon and a silica flow, but that has large contact times so that impurity pickup per unit solvent can be maximized. It is useful for the silica solvent to have approximately spherical grains for even flow. Fracking sand, which is fairly pure silica with round particles, is well adapted to flow and not prone to clumping. A slurry 82 of silica and molten silicon (perhaps with some additional additives, for example a sulfate) is introduced at the top of the concurrent buoyancy stabilized column 84. The particles in the slurry separate and settle upward in the column, similar to the steps involved in packing a chromatography column with particle-solvent slurries. Flow streamlines in column 84 are not uniform, as they would have to be in chromatography, or in the device (i.e., ultrapurifier) of FIG. 5, but any flow path for the molten silicon passes through many (hundreds or thousands) of equilibrium lengths. Unless the molten silicon flow is rapid enough to generate drag forces that overcome buoyancy and separate the particles, the packing of the liquid and the particles will be roughly 3-4 volumes of silica particles per volume of liquid silicon.

In an embodiment, the volume ratio of liquid (molten silicon) particles (fracking sand) in the slurry is from 5:1 or 7:1 to 10:1. If flow does not separate the silica particles, this means that the residence time of the particles in the column 84 will be in the rough range from 15 times to 40 times the residence time of the liquid silicon. For a purifier where the liquid does not act to separate the particles and the liquid residence time in the column 84 is 5 minutes, the residence time of the silica may be 75 minutes, or 100 minutes to 150 minutes, or 200 minutes. During this long time the silica particles will sorb and complex with the impurities in the silicon flowing around them, and will become a glass, with the glass impurity concentration an increasing function of sphere radius, and with diffusion tending to equalize the impurity concentration through the particle. For a 10% silica flow and 1% molar impurities in the silicon, the particles will become glass with 10% average molar concentration of impurities, with the impurities accumulating roughly linearly with particle residence time. The density of the silica-glass particles will remain lower than the density of the molten silicon, and the impurity-laden glassy particles will separate by differential density from the bottom of the column. The slag can be treated with an additional solvent (for example CaO) to reduce slag viscosity for convenient slag disposal.

The "coarse purifier" 80 of FIG. 8 will remove all, or substantially all, of the impurity elements having an energy of oxidation higher than that of silicon. The "coarse purifier" 80 should effectively remove most other impurity elements, removing well in excess of 99% of total impurity mass from the silicon.

The addition of additives to the silica introduced at inlet 86 of FIG. 8 may be useful to keep silica particles from adhering to each other, and immobilize impurities such as gold, silver, and the platinum metals which complex efficiently with sulfur compounds, and/or to increase the diffusivity of the glass. Addition of one, some or all of the following $CaSO_4$, $Na_2SO_4$, $Na_2O$, NaCl, and/or $H_2O$ to the slurry may serve these purposes.

FIG. 9 shows another device for purifying silicon. In an embodiment, FIG. 9 illustrates a countercurrent exchanger 90 to further purify molten silicon. The countercurrent exchanger includes concentric columns, or generally concentric columns, inner column 92 and outer column 94. A slurry 96 of relatively pure silica completely wet with the pure molten silicon is introduced into the bottom of inner column 92 passage. In an embodiment, the molten silicon is the purist molten silicon available. Structure and/or components are provided to minimize the liquid silicon contact of the slurry, with density sorting components to remove excess liquid silicon for injection upstream for further purification.

Less pure molten silicon is introduced between concentric columns 92, 94 (FIG. 9A) by way of input tube 98 and flows uniformly into the silica to equalize pressures and pressure gradients. One or more suction tubes 100 are provided to continuously, or periodically, remove spent silica from the countercurrent exchanger 90. The path lengths of silicon through the countercurrent exchange of FIG. 9 are not uniform as they would be in chromatography, but all these path lengths are long enough for many (hundreds or thousands) of equilibrium lengths, so that sorption of impurities into the particles is complete, or substantially complete.

In an embodiment, the exchanger 90 also includes an output tube (FIG. 9A) to remove purified silicon from the bottom of the inner column.

In an embodiment, the mass flow of molten silicon to silica in the slurry introduced into the top of the inner column is greater than 9:1.

In an embodiment, the spent silica is reused as silica in the coarse purifier 80.

Several stages of the purifier arrangement of FIG. 9 can be put in series. They can use different purities of silica; they can use different additives to the silica; and they can be constructed of different materials (for example graphite or sapphire coated alumina).

The present disclosure provides another device. In an embodiment, a device for purifying silicon is provided and includes a vessel having a top end, an opposing bottom end, and a plurality of concentric columns. The columns are in fluid communication with each other. The device includes a central column having a silicon inlet at a top portion of a first column for introducing molten silicon into a bed of a plurality of silica particles to form a slurry. The device includes a first channel in fluid communication with a bottom portion of the central column for receiving a portion of the slurry. The glassy silica particles, which are less dense than the liquid silicon, separate from the molten silicon by differential density and rise into the first channel. This impurity-laden glassy slag collects at the top of this first channel and is continuously, or intermittently, removed. The device includes a second channel in fluid connection with the first channel which collects the more dense molten silicon, separated from the impurity-laden glassy particles by differential density.

In an embodiment, FIG. 10 shows a device 110. Device 110 includes a vessel 112 having a top end 114, and an opposing bottom end 116. A concurrent and countercurrent exchange arrangement is built in a combined form in the vessel 112. Within a first central column 118 is a bed of silica particles (plurality of silica particles). In an embodiment, the silica particles are fracking sand. The central column 118 receives molten silicon at inlet 120 to form a slurry 122 of the molten silicon and the silica particles. A downward flow of the slurry 122 in a first central column 118 (coarse purifier) removes most of the impurities as glassy slag 124. The glassy slag 124 is removed by differential density separation at slag outlet 126. Molten silicon separated by differential density from slurry 122 flows through a countercurrent flow arrangement 128 of a first channel 130 and a second channel 132. The first channel 130 and the second channel 132 are in fluid communication with each other. A portion of the silicon 123 flows upward in the first channel 130. The flow of silicon 123 then turns and enters the second channel 132 and flows downward. The upward flow in the first channel 130 and the downward flow in the second channel 132 produces the countercurrent flow arrangement 128.

Structure and/or components are provided to introduce a slurry of silica and the silicon at inlet 134. In an embodiment, the silicon is the purist available silicon. Structure and/or components are provided to remove spent countercurrent silica at outlet 136 and form a many equilibrium (or partial equilibrium) countercurrent exchange. The slurry of spent silica removed from the countercurrent flow arrangement 128 can be separated, with the silica particles recycled back into the first column 118 (coarse purifier). The molten silicon entrained with the spent silica can be reintroduced upstream of the countercurrent flow arrangement 128 for further purification. Purified molten silicon is collected at product outlet 138.

The present disclosure provides another device. In an embodiment, FIG. 11 shows a device 210. Device 210 illustrates another Darcy flow buoyancy stabilized countercurrent exchange for silicon purification—in this case with a selectively oxidizing molten salt purifying the elements in ground solid silicon that form silicides that melt below the melting point of silicon and that removes impurities (impurities including the transition metals including Au, Ag, and the platinum group metals, and combinations thereof) that diffuse relatively rapidly through silicon crystals so that they can be selectively oxidized and removed from the silicon particle surfaces by the selectively oxidizing molten salt by a many theoretical exchange countercurrent flow.

In an embodiment, the device 210 includes a vessel 212 having a top end 214 and a bottom end 216. A sidewall 218 extends between the opposing ends 214, 216 and defines a chamber 220. A silicon inlet 222 is located at a top portion of the vessel 212 for introducing silicon particles into the chamber 220.

When the silicon particles contact the molten salt, the temperature of the silicon particles quickly rises and the silicon particles then have a temperature greater than 1350° C.

The device 210 includes an injection structure 224 at a bottom portion of the vessel 212. The injection structure 224 has at least one orifice for introducing a molten salt composition into the chamber 220. The molten salt composition has a temperature greater than 1350° C. The molten sat composition includes an oxidizer dissolved in the molten salt. The vessel includes a countercurrent exchange section 226 located between the silicon inlet and the injection structure. The countercurrent exchange section 226 includes a controlled downward flow 228 of the silicon particles. The countercurrent exchange section 226 also includes a controlled upward flow 230 of the molten salt composition. The downward flow 228 and the upward flow 230 form a countercurrent flow between the silicon particles and the molten salt in the countercurrent exchange section 226. At a bottom portion of the vessel 212, a well 232 collects purified silicon particles.

In an embodiment, the oxidizer in the molten salt composition is sulfur, or excess sulfur.

In an embodiment, the silicon particles present in the countercurrent exchange section 226 have temperature greater than 1350° C., or 1360° C., or 1370° C., or 1380° C., or 1390° C. to 1400° C.

In an embodiment, the countercurrent exchange causes impurities in the silicon particles to diffuse to the silicon particle surface. The oxidizer oxidizes the surface impurities and the oxidized impurities are dissolved in the molten salt.

In an embodiment, the molten salt contains the dissolved oxidized impurities and moves upwardly past the purified silicon particles.

In an embodiment, purified silicon particles move downwardly through the molten salt composition to the bottom of the vessel. The purified silicon particles are collected in the well 232.

In an embodiment, the controlled downward flow 228 has a rate from 0.1 mm/second, or 1.0 mm/second, or 2.0 mm/second, or 3.0 mm/second to 4.0 mm/second, or 5.0 mm/second.

In an embodiment, upward flow 230 has a rate from 0.1 mm/second, or 1.0 mm/second, or 2.0 mm/second, or 3.0 mm/second, or 4.0 mm/second, or 5.0 mm/second, or 10.0 mm/second to 15.0 mm/second, or 20.0 mm/second.

In an embodiment, the rate for the downward flow 228 and the upward flow 230 is the same, or substantially the same.

In an embodiment, the molten salt composition includes a molten salt selected from molten NaCl, molten KCl, molten $Al_2S_3$, molten $Na_2S$, molten $K_2S$, and combinations thereof.

In an embodiment, the oxidizer is a sulfur-based composition selected from the group consisting of sulfates, sulfides, and combinations thereof.

In an embodiment, the device 210 includes a pump device in operative communication with the vessel 212 for moving the molten salt composition upwardly through the vessel.

In an embodiment, the device 210 includes a melting device in fluid communication with the bottom end of the vessel. The melting device receives the purified silicon particles from the vessel 212. The melting device melts the purified silicon particles to form purified molten silicon.

In an embodiment, the vessel 212 is composed from a material selected from sapphire or graphite. In a further embodiment, the vessel 212 is composed of graphite.

FIG. 12 shows another device for purifying silicon. In an embodiment, FIG. 12 shows a liquid-liquid countercurrent exchange through a packed sapphire bead column with molten silicon as the sapphire nonwetting liquid and a molten salt as the sapphire wetting liquid. The molten salt is a mixture of molten NaCl, molten $Na_2S$, molten $Al_2S_3$ or other salts including enough excess sulfur for a significant partial pressure of sulfur, pS, and enough silicon sulfide partial pressure to inhibit any net silicon oxidation. The high pS molten salt selectively oxidizes and dissolves noble metals from the silicon in an isothermal many HETP exchange. The molten salt is recirculated through nearly isothermal electrolytic plates that remove the noble metals from the molten salt so that the recirculated clean solvent supplied to the countercurrent exchange is extremely pure with respect to the noble metals. Scaling the drawing and assuming that one HETP is about four bead diameters in this exchanger, the column shown would be about 10 HETPs. The liquid-liquid countercurrent exchanger of FIG. 12 is not strictly a Darcy flow, though it is a close flow analogy to Darcy flow, with the solid sapphire surfaces organizing the liquid-liquid contact of the exchanger. The molten salt wets the sapphire surface strongly, and is immiscible with the molten silicon, so that the salt flows upward by differential density, with the absorbed film from one particle feeding another. The silicon flows downward through a tortuous path very similar to the path that liquid moving through an ordinary packed bed would follow. It is understood that with liquid-liquid exchangers (such as the exchanger shown in FIG. 12), flooding of the exchanger is to be avoided.

In an embodiment, the exchanger of FIG. 12 operates downstream of the coarse purifier, and removes rare and noble metals (Ag, Au, and the platinum group) and other metals that react more strongly with sulfur than with oxygen.

The exchanger of FIG. 12 effectively removes noble metals that are difficult to remove from liquid silicon, and may add other impurities. The impurity atoms added (Na, K, Cl, S) all have very high coefficients of separation in silica and silica glasses, and can be completely removed by a downstream exchanger, for example the ultrapurifier of FIG. 5.

Figure 13:
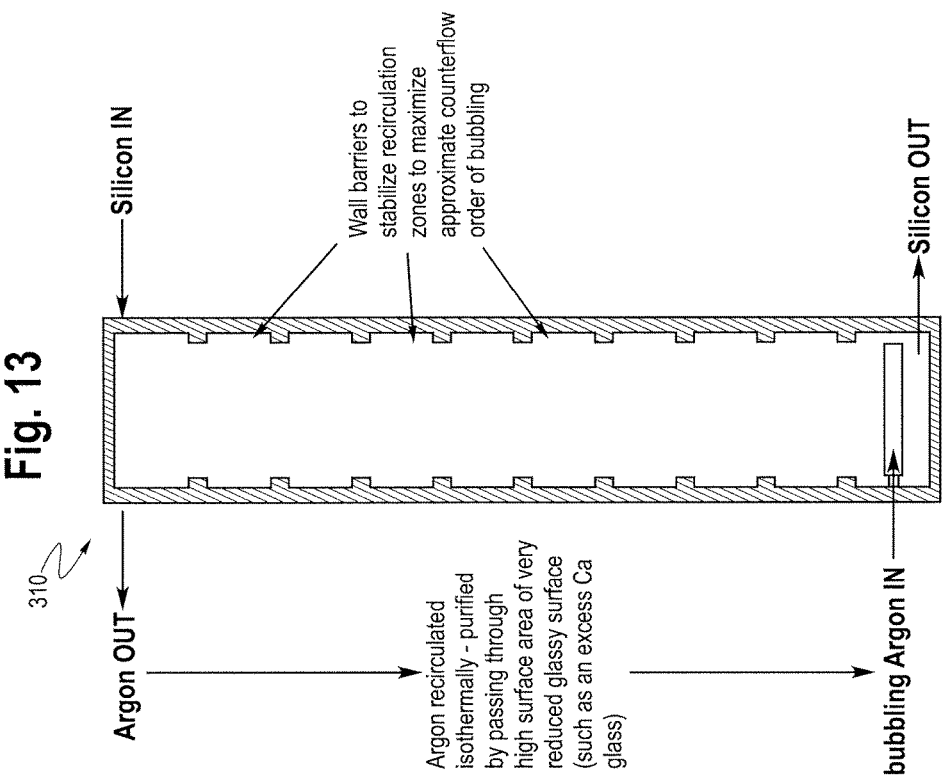
FIG. 13 is a schematic representation of an argon bubbling arrangement with argon recirculation for removing oxygen that is not removed by the selective oxidation purification stages. This deoxidation stage is a last purification stage prior to solidification.

FIG. 13 shows another device for purifying silicon. In an embodiment, FIG. 13 shows a deoxidation column 310. Molten silicon is introduced into the column 310. An isothermal argon bubbling arrangement with argon recirculation for removing oxygen (and any trace of sulfur) that is not removed by the selective oxidation purification stages from the molten silicon. Argon and the other inert gases are insoluble in pure molten silicon. Argon bubbles will absorb oxygen (as SiO) and any sulfur (as SiS or $SiS_2$) as they rise through the molten silicon. Compared to the melting energy of the silicon, the mechanical energy of pumping large quantities of inert gas bubbles through the silicon is small. Silicon oxides or sulfides, and any other volatiles, including about 0.6 ppm of silicon vapor will be carried up with the argon. The argon that has passed through the silicon can be readily purified by passing it through a high interfacial area covered with very reducing glass at its surfaces. A vertical bubbling column is shown with bubble flow upward, silicon flow downward, and with the sapphire tube wall containing the bubbling interrupted with wall recirculation zones so that the silicon flow roughly approximates a countercurrent flow, without the formation of short-circuiting full vertical scale recirculation at the walls. More than 10 HETPs are possible with such a bubbling column, and if greater purification is required, similar columns can be placed in series. The ideal oxygen concentration in the silicon output may not be zero, because a small concentration of oxygen can add mechanical strength to crystalline silicon.

In an embodiment, rising argon bubbles pass through downwardly moving molten silicon by way of countercurrent exchange.

In an embodiment, argon bubbles pass through the molten silicon by way of turbulent flow.

In an embodiment, the column 310 is composed of sapphire (crystalline $Al_2O_3$) which is insoluble in pure molten silicon.

In an embodiment, the purified silicon from device 10 is introduced into the deoxidation column 310.

In an embodiment, the purified silicon from the device 110 is introduced into the deoxidation column 310.

In an embodiment, the purified silicon from the device 210 is introduced into the deoxidation column 310.

FIGS. 14 to 20 are a series of schematic diagrams of purifier components arranged in series for effective purification, each carrying out the basic low energy silicon purification scheme of the present disclosure.

Figure 14:
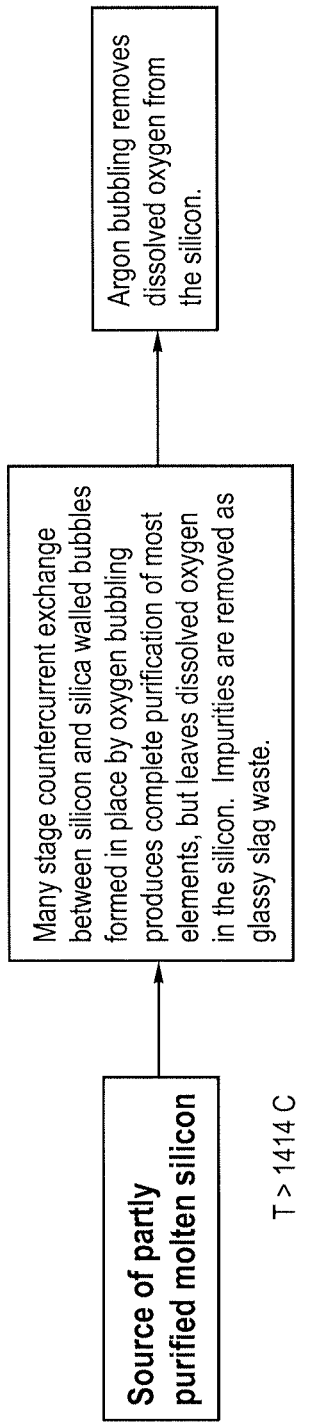

FIG. 14 shows the simplest ultrapurifier arrangement, a melter of relatively pure silicon input, the thin walled silica sphere ultrapurifier, followed by argon deoxidation.

Figure 15:
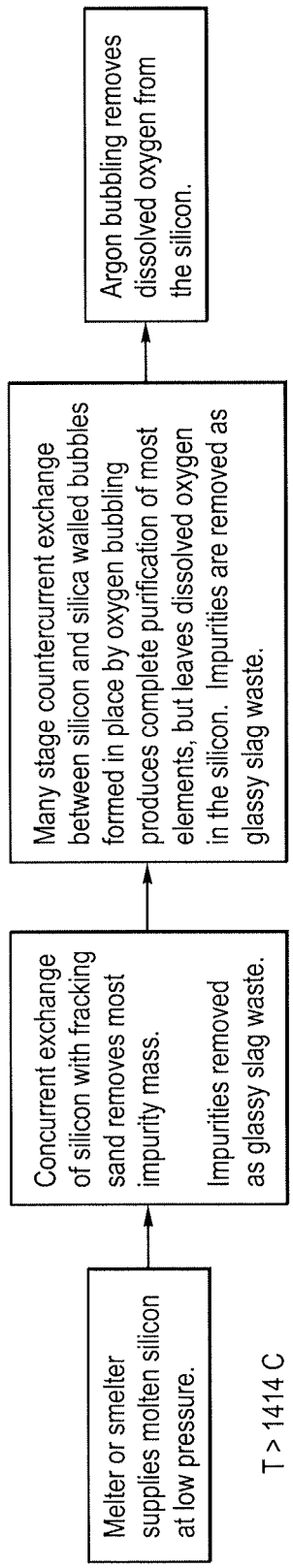

FIG. 15 shows a melter feeding molten silicon to a coarse purifier which feeds molten silicon to a thin walled silica sphere ultrapurifier, followed by argon deoxidation.

FIG. 16 shows a melter feeding molten silicon to a coarse purifier which feeds molten silicon to a countercurrent exchanger similar to that of FIG. 9 which feeds a thin walled sphere ultrapurifier, followed by argon deoxidation.

FIG. 17 shows a melter feeding molten silicon to a coarse purifier which feeds two countercurrent exchangers similar to that of FIG. 9 arranged in series, followed by argon deoxidation.

FIG. 18 shows a melter feeding molten silicon to a coarse purifier followed by a countercurrent molten salt exchange purification stage feeding silicon to a thin walled silica sphere ultrapurifier, followed by deoxidation.

FIG. 19 shows a solid ground silicon purifier followed by a melter which then feeds the molten silicon to a thin walled silica sphere ultrapurifier, followed by deoxidation.

FIG. 20 shows a solid ground silicon purifier followed by a melter which then feeds the molten silicon to a countercurrent exchanger similar to that of FIG. 9, followed by deoxidation.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A device for purifying silicon comprising:
    a vessel having a top end, an opposing bottom end, and a sidewall extending between the opposing ends and defining a chamber;
    a silicon inlet at a top portion of the vessel for introducing molten silicon into the chamber;
    a gas injection structure at a bottom portion of the vessel, the gas injection structure having a plurality of orifices for introducing a gas comprising oxygen into the chamber in the form of bubbles, where introduction of the gas bubbles into the molten silicon oxidizes silicon at the outside of the bubbles and produces a plurality of in situ silica-walled gas filled beads in the chamber;
    a countercurrent exchange section located between the silicon inlet and the gas injection structure, the countercurrent exchange section comprising
    (1) a controlled downward flow of the molten silicon;
    (2) a controlled upward flow of the beads;
    wherein the countercurrent flow between the molten silicon and the silica-walled gas filled beads provides intimate high area contact between the down-flowing molten silicon and the up-flowing beads that enables impurities present in the molten silicon to transfer into the up-flowing silica walled gas filled beads so that the down-flowing molten silicon is purified.

2. The device of claim 1 wherein the transfer of impurities to the silica-walled gas filled beads convert the relatively pure bead silica walls initially formed by bubbling to less pure bead silica walls, so that the plurality of up-flowing gas filled beads carry impurities upward as the molten silicon flows downward.

3. The device of claim 1 wherein the countercurrent exchange section has a volume and the volume comprises a packed bed the of beads and interstitial molten silicon.

4. The device of claim 1 wherein the countercurrent exchange section comprises from 20 vol % to 35 vol % molten silicon and from 80 vol % to 65 vol % silica-walled oxygen beads.

5. The device of claim 1 wherein the bead silica walls have a thickness from 0.1 microns to 1.0 micron.

6. The device of any of claim 1 wherein the silicon inlet comprises a plurality of spaced-apart injection tubes.

7. The device of claim 1 wherein the gas injection structure comprises a hub and a plurality of spokes extending radially from the hub, each spoke including a plurality of gas orifices.

8. The device of claim 1 wherein the impurity elements in the purified silicon output will be at such a low concentration that they are undetectable, or less than one part per trillion.

9. The device of claim 1 wherein the vessel comprises a separation section located above the silicon inlet and the countercurrent exchange section, and the upwardly moving beads in the separation section form a foam.

10. The device of claim 9 comprising an extraction member in operative communication with the separation section, and the extraction member removes the foam from the chamber.

11. The device of claim 1 comprising a well for collecting the purified molten silicon, the well located below the gas inlet.

12. A device comprising a deoxidation column in fluid communication with the well of claim 11.

13. The device of claim 1 wherein the beads have a D50 from 100 microns to 500 microns.

14. The device of claim 1 wherein the gas comprises oxygen and $SO_2$.

15. The device of claim 1 wherein the gas comprises oxygen and argon.

16. The device of claim 1 wherein the molten silicon introduced into the chamber has a purity of at least 99.99%.

17. The device of claim 1 wherein the controlled downward flow of the molten silicon moves through the counter-current exchange section at a rate from 0.1 millimeter (mm)/second (s) to 10.0 mm/s.

18. The device of claim 1 wherein the controlled upward flow of the beads moves through the counter-current exchange section at a rate from 0.1 mm/s to 10.0 mm/s.

19. The device of claim 1 wherein the countercurrent exchange section exhibits a steady-state/steady-flow whereby the net rate at which the beads are supplied at a lower end of the countercurrent exchange section is substantially the same as the net rate at which the beads are removed from an upper end of the countercurrent exchange section.

20. The device of claim 9 wherein the separation section comprises a plurality of spaced-apart ports for introducing a media gas into the separation section.

* * * * *